(12) United States Patent
Aharoni et al.

(10) Patent No.: US 10,520,735 B1
(45) Date of Patent: Dec. 31, 2019

(54) APPARATUSES, METHODS AND SYSTEMS FOR MULTIPLE FOCAL DISTANCE DISPLAY

(71) Applicant: Meta View, Inc., San Mateo, CA (US)

(72) Inventors: Rami Aharoni, Rehovot (IL); Ashish Ahuja, Mountain View, CA (US); Zhangyi Zhong, San Francisco, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 16/101,031

(22) Filed: Aug. 10, 2018

Related U.S. Application Data

(63) Continuation of application No. 15/298,181, filed on Oct. 19, 2016, now Pat. No. 10,088,685.

(60) Provisional application No. 62/243,641, filed on Oct. 19, 2015.

(51) Int. Cl.

| | |
|---|---|
| *G02B 27/01* | (2006.01) |
| *H04N 13/398* | (2018.01) |
| *H04N 13/344* | (2018.01) |
| *F21V 8/00* | (2006.01) |
| *G02F 1/1335* | (2006.01) |
| *H04N 13/337* | (2018.01) |
| *G02F 1/13357* | (2006.01) |

(52) U.S. Cl.
CPC ....... *G02B 27/0172* (2013.01); *G02B 6/0046* (2013.01); *G02B 6/0068* (2013.01); *G02B 6/0076* (2013.01); *G02F 1/133603* (2013.01); *G02F 1/133606* (2013.01); *G02F 1/133621* (2013.01); *H04N 13/337* (2018.05); *H04N 13/344* (2018.05); *H04N 13/398* (2018.05); *G02B 2027/013* (2013.01); *G02B 2027/0112* (2013.01); *G02B 2027/0127* (2013.01); *G02B 2027/0194* (2013.01); *G02F 2203/58* (2013.01)

(58) Field of Classification Search
CPC .......................... G02B 27/0172; G02B 6/0023; G02B 6/0068; G02B 6/0073; H04N 13/337

See application file for complete search history.

(56) References Cited

U.S. PATENT DOCUMENTS

| | | | | |
|---|---|---|---|---|
| 7,046,447 | B2 * | 5/2006 | Raber ................ | G02B 17/0896 359/625 |
| 7,336,244 | B2 * | 2/2008 | Suyama ............. | G02B 27/2271 345/6 |
| 10,088,685 | B1 * | 10/2018 | Aharoni ............. | G02B 27/0172 |
| 2007/0177275 | A1 | 8/2007 | Mcguire, Jr. | |

(Continued)

*Primary Examiner* — Kevin M Nguyen
(74) *Attorney, Agent, or Firm* — Andrew Bodendorf

(57) ABSTRACT

Aspects of the disclosed apparatuses, methods and systems provide a wearable, augmented or virtual reality display system including two or more sets of backlight illumination arrangements. Each different set of backlight illumination is directed to a corresponding optical imaging system. The corresponding optical imaging system is designed to focus each set of illumination at a different distance. The selection of a particular optical focal distance is controlled by selecting the set of backlight illumination corresponding to the imaging system to provide the desired focal distance. As a result, selection of the backlight illumination determines at which distance an image is perceived by a user. When multiple backlight illumination sets are multiplexed with 2-D images, a single, 3-D image is perceived by the wearer of the display system.

15 Claims, 25 Drawing Sheets

(56) References Cited

U.S. PATENT DOCUMENTS

2008/0117289 A1   5/2008   Schowengerdt
2010/0002154 A1   1/2010   Hua
2014/0267420 A1   9/2014   Schowengerdt
2015/0235438 A1   8/2015   Schowengerdt
2015/0241698 A1   8/2015   Schowengerdt
2016/0307482 A1   10/2016  Huang et al.

* cited by examiner

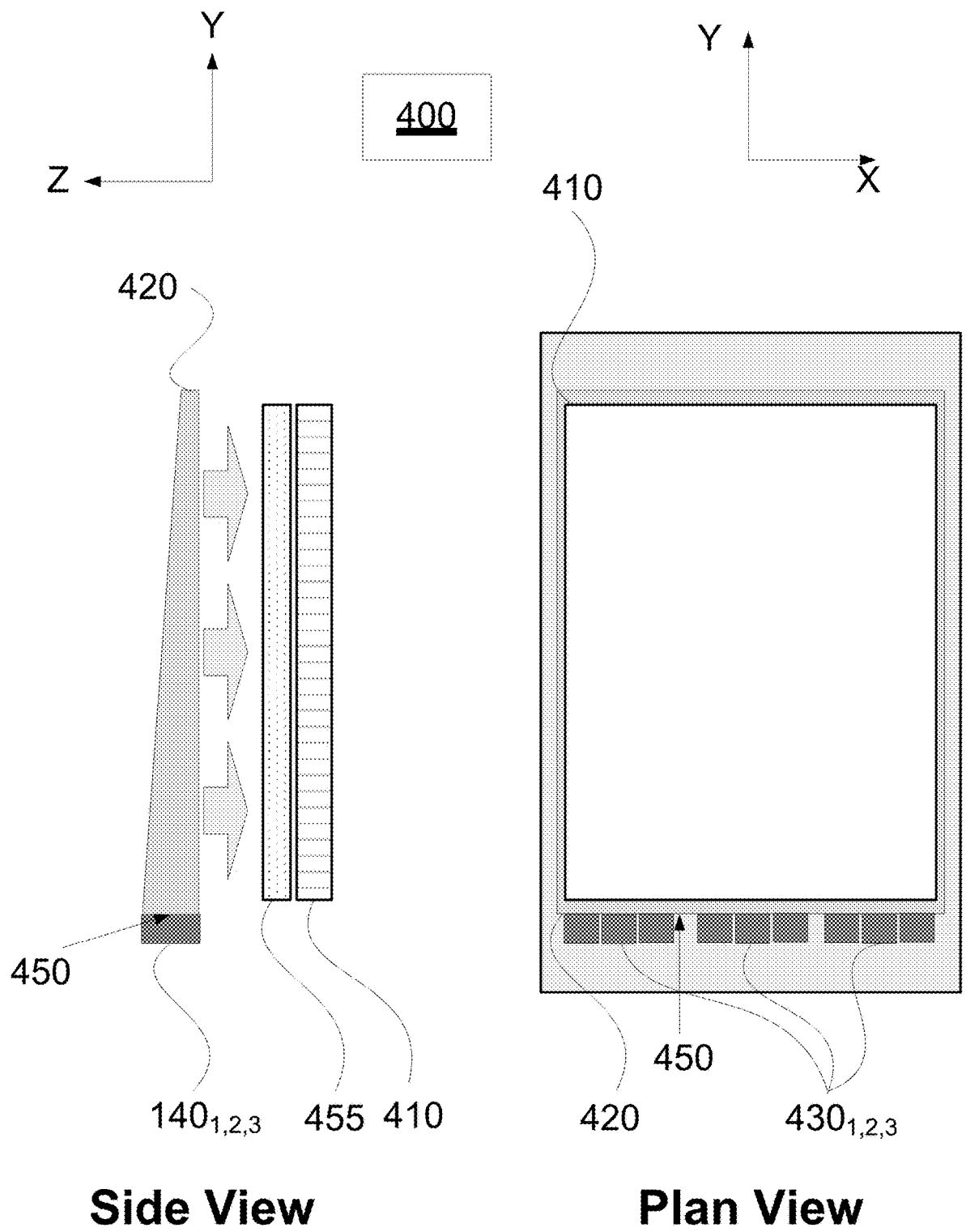

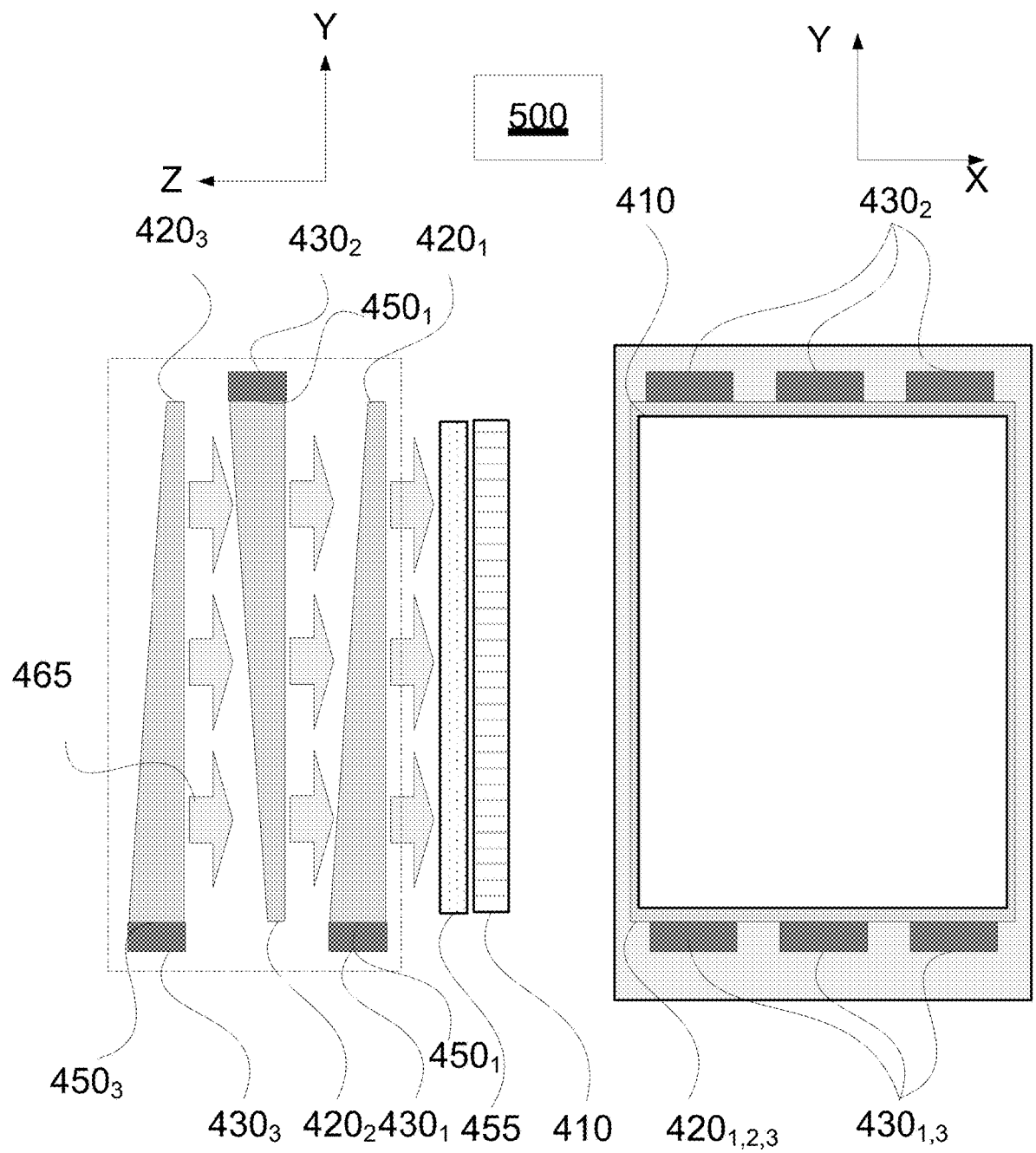

Side View

Side View

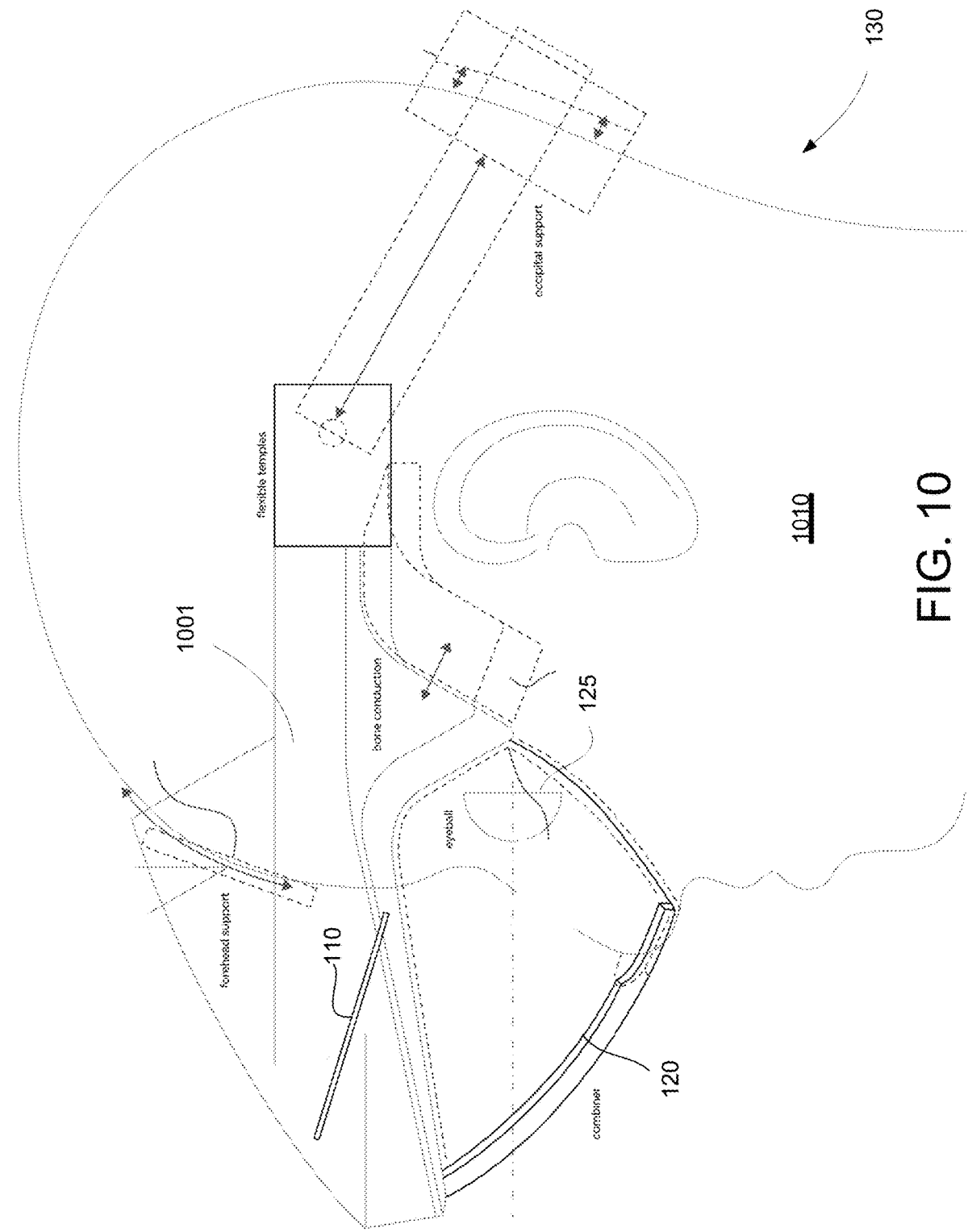

APPARATUSES, METHODS AND SYSTEMS FOR MULTIPLE FOCAL DISTANCE DISPLAY

CROSS-REFERENCE TO RELATED APPLICATIONS

This application is a continuation of U.S. patent application Ser. No. 15/298,181 titled "APPARATUSES, METHODS AND SYSTEMS FOR MULTIPLE FOCAL DISTANCE DISPLAY" filed Oct. 19, 2016, which claims the benefit under 35 U.S.C. § 119(e) of U.S. Provisional Application No. 62/243,641, titled "APPARATUSES, METHODS AND SYSTEMS FOR MULTIPLE FOCAL DISTANCE DISPLAY" filed on Oct. 19, 2015 in the U.S. Patent and Trademark Office, both of which are herein expressly incorporated by reference in their entirety for all purposes.

BACKGROUND

The interest in wearable technology has grown considerably over the last decade. For example, augmented reality (AR) displays that may be worn by a user to present the user with a synthetic image overlaying a direct view of the environment. In addition, wearable virtual reality (VR) displays present a virtual image to provide the user with a virtual environment. Many companies are attempting to transfer AR and VR technology from its early military applications to more widely available consumer electronics.

SUMMARY

Aspects of the disclosed apparatuses, methods and systems provide a wearable, augmented or virtual reality display system including two or more sets of backlight illumination arrangements. Each different set of backlight illumination is directed to a corresponding aspect of an optical system. The optical system is designed to focus each set of backlight illumination at a different optical focal distance. The selection of a particular optical focal distance is controlled by selecting a corresponding set of backlight illumination. As a result, selection of the active set of backlight illumination determines at which distance the image is perceived by a user wearing the AR or VR system. When multiple backlight illumination sets are multiplexed, a single, 3D image is created as perceived by the wearer of the AR or VR system by the combination of corresponding 2D images formed at the different focal distances. Examples of the types of multiplexing include: wavelength multiplexing, polarization multiplexing, or a combination of polarization and wavelength multiplexing.

In one general aspect, a display system includes a display assembly and an optical system. The display assembly includes a display, and an illumination source arranged in proximity to the display and operable to generate color illumination backlighting an image presented by the display in two or more different backlight sets. The optical system is positioned relative to the display system to reflect light received from the display assembly to the eyes of a user of the wearable display system. The optical system includes at least two reflective optical surfaces. Each optical surface reflects light of an image illuminated with a different backlight set and provides an image that is perceived by the user at a different focal distance corresponding to one the different backlight sets.

The system may further include a control device. The control device selects different backlight sets to control the illumination source to backlight a corresponding image presented by the display and vary the focal distance of the reflected light of the image. The control device also may control sequencing of the image between the at least two focal distances in combination with vergence of the image to either eye of a user to create a perceived three-dimensional image by the user.

The display assembly may generate light of the same color centered at two or more different wavelengths, and each of the different wavelengths corresponds to one of the backlight sets. Each optical surface may reflect light of a different one of the two or more wavelengths.

The display assembly also may generate color illumination of the image in three different backlight sets; and the optical system comprises at least three optical surfaces, wherein each optical surface reflects light of an image illuminated with a different backlight set and the system provides an image that is perceived by the user at a different focal distance corresponding to one the different backlight sets by selecting one of the three different backlight sets to illuminate the image.

The display assembly also may generate light of the same color at two orthogonal polarizations, each orthogonal polarization corresponding to one of two of the backlight sets. Each of the at least two surfaces may reflect light of a different one of the orthogonal polarizations.

The display assembly also may generate light of the same color centered at two or more different wavelengths, each of the wavelengths corresponding to one of the two or more backlight sets, and the display assembly may generate light of the same color at two orthogonal polarizations, each of the orthogonal polarizations corresponding to at least one of the two or more backlight sets.

The illumination source may include a plurality of red (R), green (G), and blue (B) light emitting diodes (LEDs) including at least two LEDs of each color divided into at least two groups of RGB LEDs, each group centered at one of at least two different wavelengths corresponding to a different one of the two or more backlight sets. The display assembly may further include a waveguide positioned in proximity to the illumination source and display, the waveguide homogenizing and distributing light from the illumination sources to the display. The display assembly also may further include at least two waveguides, positioned in proximity to the illumination source and the display, each waveguide homogenizing and distributing light from only one of the at least two wavelengths. The waveguides may be adjacent and stacked.

The illumination source may include a white light and the display assembly further comprises a color filter array arranged between the illumination source and the display. The color filter array may be operable to filter the white light of the illumination source to generate light of the same color at a first polarization, and to generate light of the same color at a second polarization orthogonal to the first polarization, each of the first and second polarizations corresponding to a different one of the two or more backlight sets. The system color filter array may include a plurality of color filters grouped into cells, each cell filtering light of the same color centered at different wavelengths.

The illumination source may be a panel of the plurality of RGB LEDs grouped into cells providing light of the same color centered at different wavelengths and the display system further includes a diffuser positioned between the panel and the display.

The backlight illumination sets may be multiplexed to create, a single, 3D image as perceived by the user of the system by the combination of 2D images presented by the display formed at the different focal distances corresponding to the backlight illumination sets. The multiplexing may be one of: wavelength multiplexing, polarization multiplexing, and a combination of polarization and wavelength multiplexing.

The system may further include one or more processing devices operable to control the display and select a particular optical focal distance for an image presented by the display by selecting one of the at least two different backlight sets.

The one or more processing devices may be operable to multiplex the backlight illumination sets to create, a single, 3D image as perceived by the user of the system by the combination of 2D images presented by the display formed at the different focal distances corresponding to the backlight illumination sets. The multiplexing may be one of: wavelength multiplexing, polarization multiplexing, and a combination of polarization and wavelength multiplexing.

The system may comprise two display assemblies and two optical systems, where each display system is paired with a corresponding one of the two optical systems, and each pair is positioned to provide the image to a corresponding one of the two eyes of a user.

The details of various embodiments are set forth in the accompanying drawings and the description below. Other features and advantages will be apparent from the following description, the drawings, and the claims.

BRIEF DESCRIPTION OF DRAWINGS

The following description illustrates aspects of embodiments of the disclosed apparatuses, methods and systems in more detail, by way of examples which are intended to be non-limiting and illustrative with reference to the accompanying drawings, in which:

FIGS. 4A and 4B are side and plan views of examples of a display system providing multiple sets of RGB backlight forms;

FIGS. 5A and 5B are side and plan views of examples of a display system providing multiple sets of RGB backlight forms;

FIGS. 8D and 8E show examples of arrangements for filters with separate polarizing RGB for the display in FIG. 8A;

FIG. 10 shows a schematic illustration of an example of a wearable AR system;

DETAILED DESCRIPTION

Figure 1:
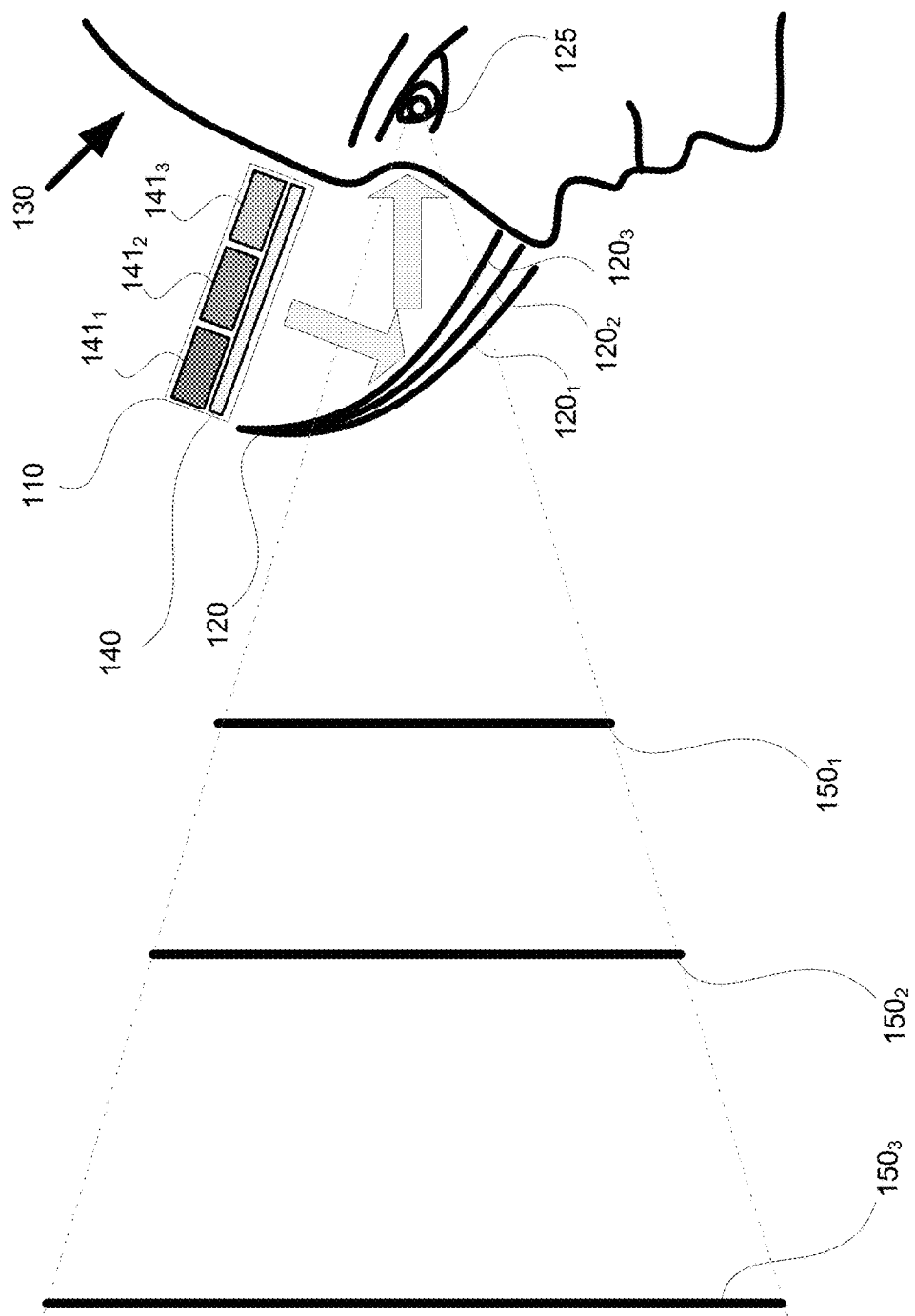
FIG. 1 schematically illustrates an example of a wearable AR display.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a".

The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments which are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized, and functional, logical, organizational, structural and/or topological modifications may be made without departing from the scope and/or spirit of the disclosure.

OVERVIEW

Wearable displays may provide the user with images in a VR or an AR environment. As mentioned above, an AR display provides a user with a synthetic image overlaying a direct view of the user's environment. With regard to AR displays, examples of a synthetic over-laid images include informative text, graphic symbol indications of location and alignment, and full three-dimensional (3D) images and video that are provided for interaction with the see-through environment. The rendition of a 3D image may include a perspective, two-eye correction for divergence to accommodate 3D images that are presented at relatively short distances. However, wearable displays available today are typically incapable of controlling the depth-of-focus of the images to complete the 3D viewing experience. For example, the eye of a viewer of a 3D image expects both corrections of the vergence as well as the focal distance as part of the user's naturally occurring 3D vision process. Absence of the expected accommodation for focal distance can result in strain on the eyes and uncomfortable viewing over time for many users.

The following description pertains to the field of wearable displays and particularly to wearable virtual and augmented reality displays. For example, a binocular wearable AR display is described that controls the focal distance of a synthetic image. The resulting display more accurately renders a true 3D view allowing the eyes to both change their viewing angles for closer objects and accommodate the correct focal distance. Such full rendition of 3D synthetic images provides a more realistic image in addition to significantly reducing eye fatigue of user over time or with protracted use.

General Description

The wearable AR display system as described herein includes a new digital display system which includes two or more sets of red-green-blue (RGB) backlight illumination arrangements. Each different set of RGB illumination is directed to a corresponding aspect of an optical system. The optical system is designed to focus each RGB set of illumination at a different optical focal distance. The selection of a particular optical focal distance is controlled by selecting a corresponding one of the sets of RGB backlight illumination. As a result, selection of an active set of RGB backlight illumination determines at which distance the image is formed by the wearable AR system. When multiple RGB backlight illumination sets are multiplexed, a single, 3D image is created as perceived by the wearer of the AR system by the combination of corresponding 2D images formed at the different focal distances. Examples of the types of multiplexing include: wavelength multiplexing, polarization multiplexing, or a combination of polarization and wavelength multiplexing.

FIG. 1 schematically illustrates an example 100 of a wearable AR display system. As shown in FIG. 1A, a synthetic 3D image is created using a display system or assembly 110 (e.g., a display and backlight combination) that is redirected by an at least partially transparent optics system 120 (e.g., a combiner-imager) into the eyes 125 of a user 130. The display system 120 is positioned relative to the user 130 and image combiner 120 so that different regions of the display system 110 are viewed with each eye 125 to generate a perspective view of the synthetic image by each eye. The display system 110 is schematically and conceptually represented as a separate imaging source 140, and different backlight illumination sources 141. In the example shown in FIG. 1, three backlight illumination sources $141_1$, $141_2$, and $141_3$ are provided; however, one skilled in the art will appreciate two or more sources may be used.

In one example, the imaging source 140 is an array of liquid crystal pixels where the transmission of each pixel from the source 140 is electronically controlled to generate a two-dimensional image (e.g., by the output from a graphics or other processing system not shown). Of course, one skilled in the art will appreciate that the imaging source 140 also can be implemented with other transmission or reflection technologies, such as, for example, Liquid Crystal on Silicon (LCoS or LCOS), magneto-modulated, electro-modulated crystals, and vibrating MEMS arrays, to name but a few, some of which are discussed in further detail below.

In one example, the backlight sources 141 generate two or more multiplexed sets of RGB backlight illumination. The different sets of backlight illumination can be differentiated by different RGB wavelengths, different RGB polarizations, or both, as explained in further detail in the following description.

The optics system 120 is sufficiently transparent to allow the user to directly view the environment outside of the optics system 120. In one example, the optics system 120 is a combiner-imager. The combiner-imager overlays the view of the user's environment with a synthetic image generated by the display system 110 to provide what is commonly known as an augmented reality (AR) display. If the combiner-imager is made opaque to the external view, the display is referred to as a virtual reality (VR) display. The combiner-imager is shaped so as to provide optical power (e.g., by having a suitably curved surface) such that an image of the synthetic input of the display system is presented at the desired viewing distance: at least 25 cm (below which an eye cannot typically focus) to infinity. Different portions of the display system are viewed by each eye, with or without overlap between them. Thereby the image projected to each eye can be controlled independently to generate the suitable perspective view.

The optics system 120 combines multiple reflective surfaces that are positioned relative to the display system such that the light emitted from the display system is reflected and visible to the eyes of a user. For example, the optics system 120 shown in FIG. 1 has three reflective surfaces $120_1$, $120_2$, and $120_3$ corresponding to the three backlight illumination sources $141_1$, $141_2$, and $141_3$. Each reflective surface 120 reflects a different set of the RGB illumination from the display system 110. Each reflective surface 120 has a different optical power. As a result, each set of RGB illumination input from the display is reflected with a different corresponding optical power to form an image at a different focal distances to the viewer. By defining different images, at different focal plane distances and different perspective angles, several images at different depths can be displayed sequentially providing for a physically distributed image in space with good rendition of a true 3D object. For example, FIG. 1 shows three different image focal plane distances $150_1$, $150_2$, and $150_3$ generated by the display system 100 corresponding to the three sets of RGB illumination.

The number of different sets of RGB backlight illumination of the display system 110 and corresponding reflective surfaces of the optics system 120 implemented by any one design of the wearable AR system 100 determines the number of image depths that can be rendered. As described in further detail below, three different sets of RGB illumination generating three image focal plane distances are provided in some of the examples. However, a smaller or larger number of focal plane image distances can be implemented by varying the number of backlight sets and corresponding reflective surfaces.

In the interest of brevity, the following description generally considers a single display system 110 and optics system 120 as shown in FIG. 1. However, one skilled in the art will appreciate this configuration is exemplary and that other system configurations may be implemented. For example, although the system optics 120 are shown above as a single visor combiner-imager in FIG. 1, a separated optics system may be provided for each eye (e.g., glasses with a separate combiner imager or lens for each eye). Similarly, a separate display system 110 also may be provided for each eye. In addition, for illustrative clarity, the backlight sources 141 are shown schematically and conceptually as separate; however, in practice the backlight sources may be integrated and there is no need to physically separate the backlight sources, for example, as shown in some of the examples provided below.

Figure 2:
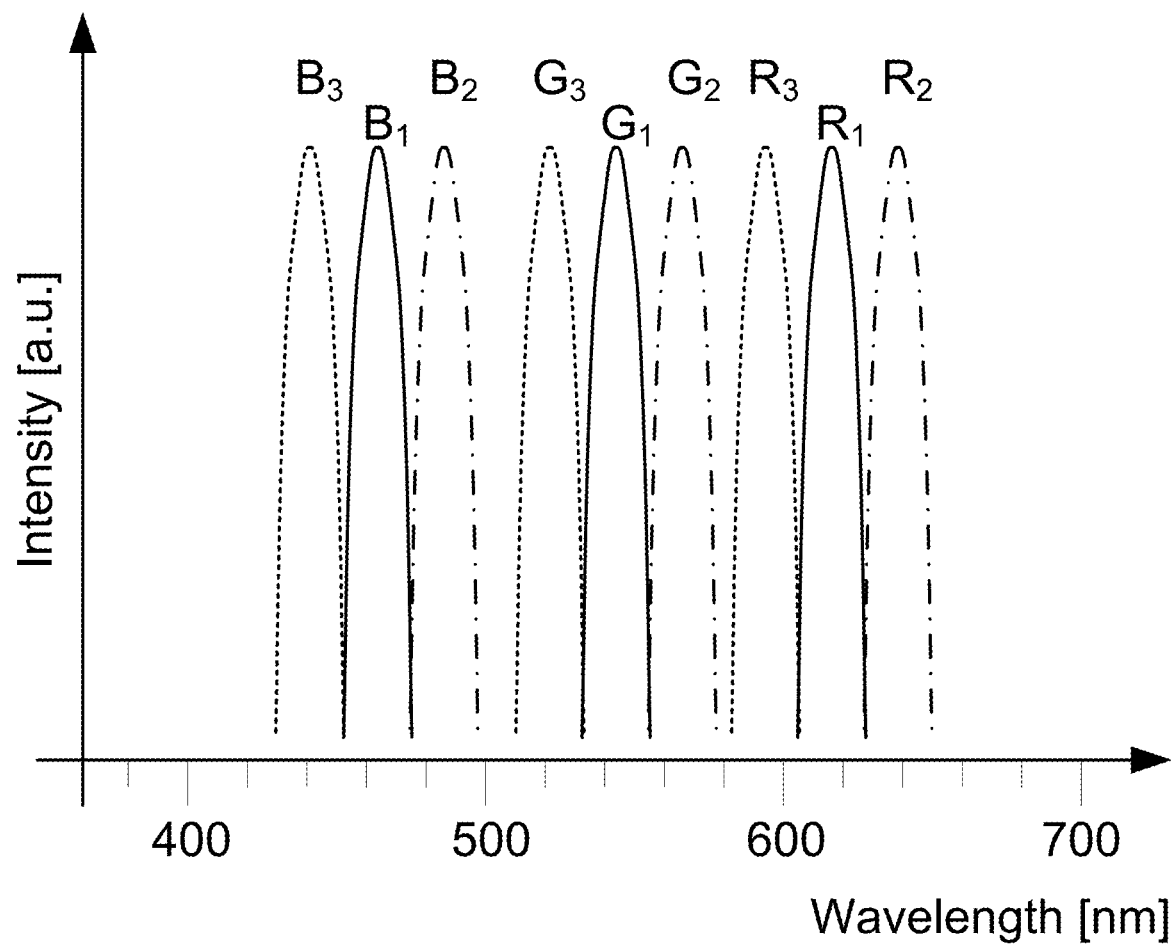
FIG. 2 is a graph showing an example of the use of multiple sets of red, green, and blue (RGB) wavelengths that may be used to illuminate a wearable AR display.

FIG. 2 shows a graph providing one example 200 of different sets of backlight illumination sources that may be multiplexed by their wavelength to provide different image focal depths, where each backlight illumination source incorporates or provides a different set of the RGB wavelengths. In this example, three different wavelength sets are used: a first wavelength set $RGB_1$ centered at {465, 555, 608 nm}, shown with solid-line wavelength bands; a second wavelength set $RGB_2$ centered at {495, 585, 640 nm}, shown with dash-dot line wavelength bands; and a third wavelength set $RGB_3$ centered at {440, 540, 590 nm}, shown with dashed line wavelength bands.

One skilled in the art will appreciated the ability to add additional RGB illumination sets depends on the bandwidth of the illumination sources. For example, in general, illumination LEDs have bandwidths of approximately 20 nm (e.g., as shown in the graph of FIG. 2). Using different RGB sets results in differences in the color gamut in the chromaticity plane (as detailed further below). In one example, the use of illumination sources with significantly reduced bands (such as lasers, or quantum-dot emitters) allows more RGB illumination sets for implementing a larger number of focal plane distances in addition to limiting the deviation between their chromatic gamut in the chromaticity plane. In another example, two of the multiplexed images may be implemented using RGB sets with different polarization, so the number of wavelengths differentiated RGB sets is reduced and there is a lower discrepancy between the color gamut coverage of all the RGB sets implemented.

Figure 3:
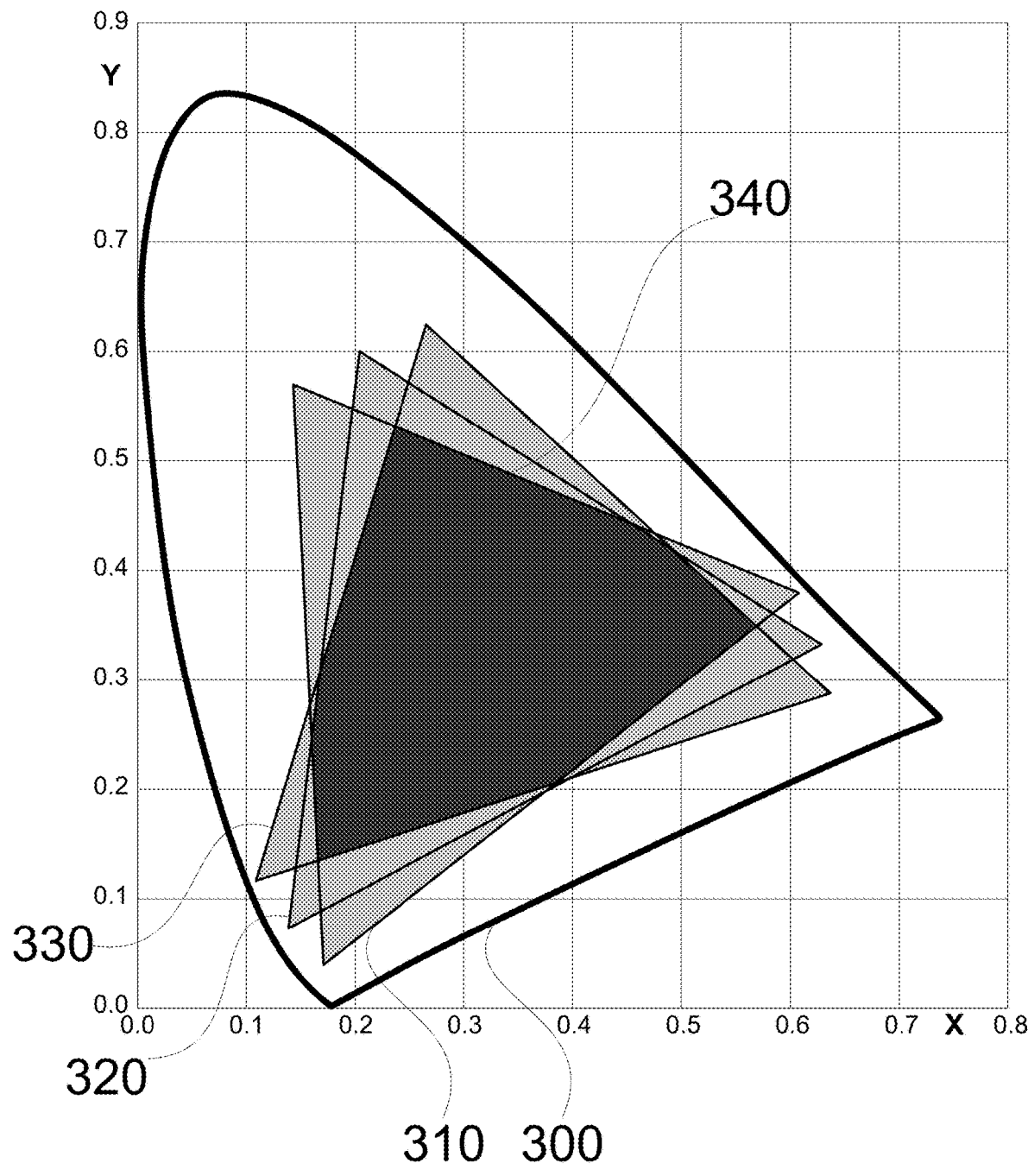
FIG. 3 is a graphical representation of an example of the chromatic gamut differences of multiple sets of RGB backlights illustrating the deviation and overlap of the different backlight sets in the chromatic space.

FIG. 3 shows a graph illustrating an example 300 of the coverage in the CIE chromatic plane of the three sets of RGB backlight illumination sources shown in FIG. 2. Each RGB set generates a slightly shifted triangle 310, 320, and 330 in the chromaticity plane. As can be seen in the graphical representations of FIG. 3, the use of different wavelengths for the different RGB sets introduces areas in the chromaticity plane which cannot be "addressed" by all the backlights. Conversely, however, there is a large overlapping region 340 (high-lighted in the figure) which can be "addressed" by all of the backlight sets. Of course, one skilled in art will understand that different wavelength set and backlight illuminations sources may be used. For example, it is noted that, for each RGB set, different RGB values are required to reach the same location on the chromaticity chart, or, in other words, to obtain the same perceived color in the three backlight sets. Therefore, it is possible to replicate most of the colors in all RGB sets by using a corrected RGB weighting for each set. Only at the boundary of the color hue diagram are there differences. It is further noted, that using narrower LED bandwidths both enlarge the chromatic gamut of each of the wavelength-differentiated background illumination sets as well as reduce the differences between the gamut coverage. Therefore, use of narrow-band RGB LED illumination, or even laser illumination, as an illumination source generates a higher color quality for any corresponding display.

Display Systems

FIGS. 4A and 4B show one example 400 of a schematic representation of a display system 110 providing multiple sets of RGB backlight illumination.

FIGS. 4A and 4B schematically show both a side view in the z-y plane and a plan view (i.e., from the direction the display is normally viewed) in the x-y plane of a display system 110 and its main components. As shown in FIGS. 4A and 4B, the components of a display system 110 include a display 410, a waveguide 420, multiple light illumination source sets 430, and a filter 455. One skilled in the art will appreciate that other components (not shown) may be included in any particular implementation, such as, for example, one or more inputs, a power source, a housing, one or more electrical connections, and/or a graphics processor, among others.

In one example, the display 410 is an LCD array. The display 410 is backlit or illuminated by light sources 430 with the aid of a homogenizing-distributing waveguide 420. The homogenizing waveguide 420 provides multiple reflections of the light sources 430 to homogenize and distribute the illumination sources to backlight the display 410. In particular, two or more sets of RGB LEDs may be used to illuminate the homogenizing-distributing waveguide 420. As shown in the example in FIGS. 4A and 4B, three sets of RGB LEDs are marked as $430_1$, $430_2$, and $430_3$ are provided corresponding to the set of RGBs centered at wavelengths described above with regard to FIG. 2. Each set of RGB LEDs provides light corresponding to a different focal distance of a synthetic image created by the reflecting surfaces of an associated optics system 120. In this example, the light sources 430 are located on a side 450 of waveguide 420. The waveguide 420 is designed such that each color is sufficiently homogenized and distributed by the waveguide to produce essentially a uniform color illumination of the entire active area LCD array. For example, the waveguide 420 is provided with sufficient dimensions to uniformly distribute the illumination on the display 410.

As shown in FIGS. 4A and 4B, the display system includes a color filter array 455 arranged adjacent to the display array to illuminate the relevant pixels of the display 410 with the backlight sets provided from the waveguide 420. The individual filters of the color filter array have sufficiently broad bandwidths to transmit each primary color (e.g., red, green, or blue) of the sets of illumination sources 430.

In this arrangement the RGB LEDs are fired sequentially and in synchronism with the activation of the relevant color pixels, for example, as directed by the input from a graphics processor (not shown). Although such sequenced firing is not mandatory, it improves the contrast of the display, reduces power consumption, and addresses the issue of heat removal. In addition, the display system 110 provides for different focal plane distances using the different sets of backlight sources that are multiplexed by their wavelength, where each backlight source incorporates a different set of RGB wavelengths, for example, as shown in FIG. 2 as $RGB_1$, $RGB_2$ and $RGB_3$. For example, the three sets of $RGB_1$, $RGB_2$ and $RGB_3$ corresponding to RGB LEDs $430_1$, $430_2$, and $430_3$, respectively, can be sequenced to backlight the colored pixels of the display 410 to generate an image at a focal distance corresponding to a selected one of the three sets.

FIGS. 5A and 5B show a plan and a side view of another example 500 of a display system 110 providing multiple sets of RGB backlight illumination. Similar to the example shown in FIGS. 4A and 4B, the system 500 includes a display 410 and a filter 455. As shown in FIGS. 5A and 5B, the display system also includes two or more "stacked" homogenizing-distributing waveguides. In this example, the display system includes three waveguides: $420_1$, $420_2$, and $420_3$ each corresponding to a set of RGB LEDs $430_1$, $430_2$, and $430_3$, respectively. Each set of RGB LEDs corresponds to a different set of RGB wavelengths (e.g., the sets $RGB_1$, $RGB_2$ and $RGB_3$ as shown in FIG. 2). Each set of RGB LEDs $430_1$, $430_2$, and $430_3$ is mounted on a side of a different homogenizing-distributing waveguide $420_1$, $420_2$, and $420_3$, respectively.

As shown in FIG. 5A, the waveguides $420_1$, $420_2$, and $420_3$ are positioned adjacent to each other. In one example, the waveguides are "stacked" along the z-dimension such that the base of each waveguide is parallel to the x-y plane. In addition, the orientation of the waveguides may be staggered, for example such that a side $450_i$ of a waveguide $420_i$ providing the illumination sources $430_i$ is opposite the side $450_i$ of any adjacent waveguide. Other waveguide assembly orientations can be used including, for example: an un-staggered orientation, where the waveguides are essentially aligned with all illuminations sources on the same side; and where each waveguide assembly is rotated, for example, 90° in about their central optical axis with respect to its neighboring waveguide. As the homogenizing-distributing waveguides 420 rely primarily on total internal reflection, the waveguides are formed to be essentially transparent to light radiated (e.g., along the z dimension in FIG. 5) perpendicular to their broad dimension (e.g., the base parallel to the x-y plane in FIG. 5). For example, light generated by the set of RGB LEDs $430_3$ are diffused and reflected by the waveguide $420_3$ and emitted as light 465 which passes through waveguides $420_2$, $420_1$ and filter 455 to illuminate the display 410. As a result, each set of RGB LEDs illuminates the display 410 through the color-filter array 455.

The configuration shown in FIGS. 5A and 5B providing waveguides that are stacked may provide a more compact overall design relative to the configuration provided in FIGS. 4A and 4B, since the different RGB LED's of each light source set associated with any one waveguide can be positioned closer to each other thereby reducing the overall size of the homogenizing waveguide needed to diffuse the light provided by each light source. However, apart from the distribution of the sets of RGB LEDs between the different waveguides $520_1$, $520_2$, and $520_3$, the operation of the display system is otherwise similar as that described above with respect to the display system shown in FIGS. 4A and 4B.

FIGS. 6A, 6B, 6C, 6D, 6E, 6F, and 6G show other examples of a display system 110 using a reflective image spatial modulation arrangement. The figures associated with the following examples show arrows representing the different polarization of light and some of the illumination provided within the display system. However, one skilled in the art will appreciate that the arrows are provided generally to illustrate and help explain the direction and/or polarization of the light within the system and do not represent an amount or intensity of light in any particular example or part of the system. In addition, by way of example, FIGS. 6A-6E show polarizations, such as s-type linear polarization and p-type linear polarization; however, one skilled in the art will appreciate that any other combination of orthogonal polarizations can be used in a manner consistent with the teachings and examples given herein.

Figure 6A:
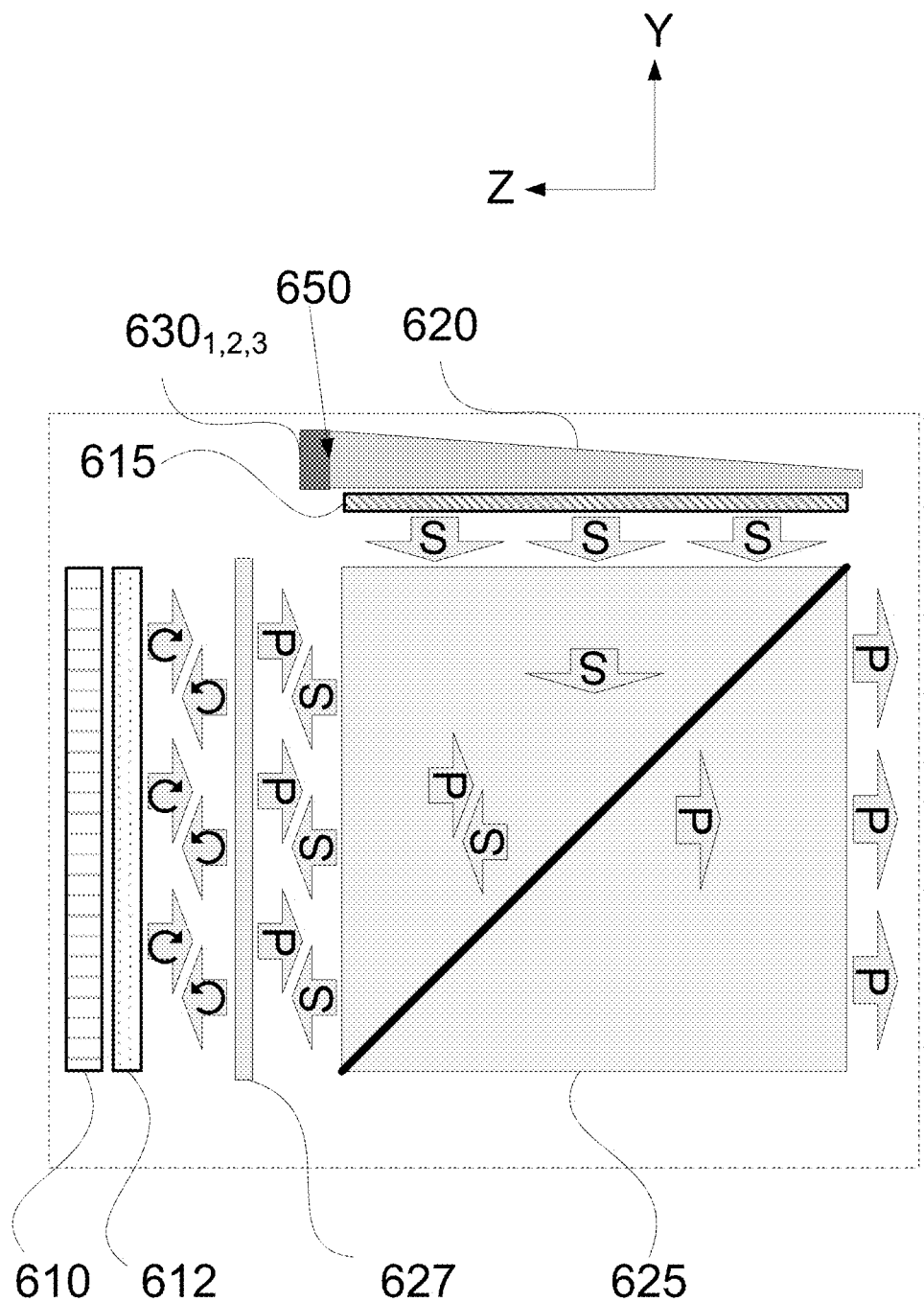
FIGS. 6A, 6B, 6C, 6D, 6E, 6F, and 6G are schematics representations of examples of a display system using a reflective spatial modulator display with multiple sets of RGB backlight forms.

FIG. 6A shows a side view of a display system 110 that includes a display 610, a filter 612, a polarizer 615, a waveguide 620, a polarizing beam splitter 625, and a quarter wave plate 627.

As shown in FIG. 6A, the display 610 may be implemented using an LCoS or vibrating mirror reflective spatial modulator. The display 610 may be backlit or illuminated by light sources 630, with the aid of a homogenizing-distributing waveguide 620. The homogenizing waveguide 620 provides multiple reflections of the light sources 630, to homogenize and distribute the illumination sources. The homogenizing waveguide 620 provides multiple reflections of the light sources 630, to homogenize and distribute the illumination sources to backlight the display 610. In particular, two or more sets of RGB LEDs may be used to illuminate the homogenizing-distributing waveguide 620. As shown in the example in FIG. 6A, three sets of RGB LEDs are marked as $630_1$, $630_2$, and $630_3$ are provided corresponding to the sets of RGBs centered at wavelengths described above with regard to FIG. 2. Each set of RGB LEDs provides light corresponding to a different focal distance of a synthetic image created by the surfaces of an associated optics system 120. In this example, the light sources 630 are located on a side 650 of waveguide 620. The waveguide 620 is designed such that each color is sufficiently homogenized and distributed by the waveguide to produce essentially a uniform color illumination of the display 610. For example, the waveguide 620 is provided with sufficient dimensions to uniformly distribute the illumination.

The light emitted from the homogenizing-distributing waveguide 620 passes through the polarizer 615 and is polarized. The polarized illumination (e.g., indicated here as s-polarization by way of example) is incident on the polarizing beam-splitter 625 and fully reflected to illuminate the display 610. The reflected s-polarized illumination is converted to circular polarization (e.g., clockwise) with a quarter wave-plate 627. The light passes through the filter 612 and is reflected by the display 610 with a different circular polarization (e.g., counter clockwise). The display 610 provides different pixels that are reserved for different colors provided from the color filter array 612. The color filter array spectra are broad enough to transmit all the three primary colors of each of the RGB sets (e.g., the sets $RGB_1$, $RGB_2$ and $RGB_3$ as shown in FIG. 2). For example, if there are three sets of RGB illumination, then $R_1$, $R_2$ and $R_3$ all will be transmitted through the red filter of the filter array 612. The circular polarized light reflected from the display 610 passes through the quarter wave-plate 627 and is converted into p-polarized light. The p-polarized light traverses the polarizing beam-splitter 625 and is output toward the associated optics system 120.

Figure 6B:
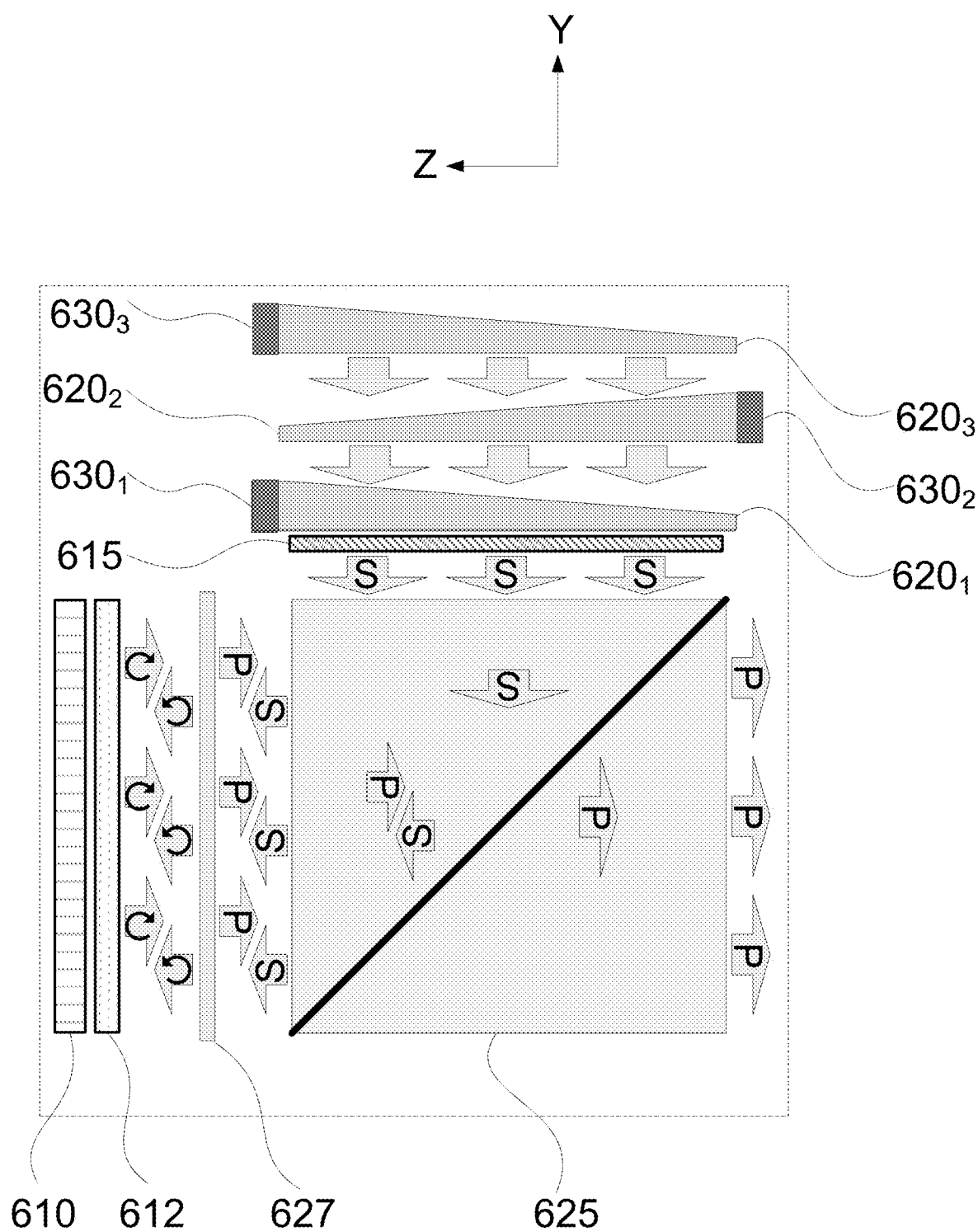

To provide different focal plane distances associated with each of the sets of illumination, for example, $RGB_1$, $RGB_2$ and $RGB_3$, the display system of FIG. 6A should be sequenced to allow the colored pixels of the display 610 to generate the appropriate image for the relevant image distance. Although this example considers a spatial light modulator with a color filter array, one skilled in the art will appreciate consistent with the teachings herein that the same arrangement would work for an RGB sequenced red, green and blue illumination with no color filter. In this case, the sequencing is both over each $R_i$, $G_i$ and $B_i$ color and then over the three sets of RGB, FIG. 6B shows another example of a display system. This display system is similar to the system shown in FIG. 6A; however, as shown in FIG. 6B, the display system includes two or more "stacked" homogenizing-distributing waveguides, in a configuration similar to that described above in associated with FIGS. 5A and 5B. By way of example, FIG. 6B shows three such waveguides: $620_1$, $620_2$ and $620_3$. As described above, the homogenizing-distributing waveguides 620, rely primarily on total internal reflection so the waveguides are made essentially transparent to light radiated perpendicular to the broad dimension (e.g., x-y plane of the base of the waveguide). When stacked adjacent to each other, illumination from each of the waveguides illuminates the display 610. This example also uses a color-filter array 612; however, uniform sequential RGB backlight illumination also may be used. As in the previously described examples, the focal plane distance is controlled through use of the different RGB illumination sets (e.g., the sets $RGB_1$, $RGB_2$ and $RGB_3$ as shown in FIG. 2).

Figure 6C:
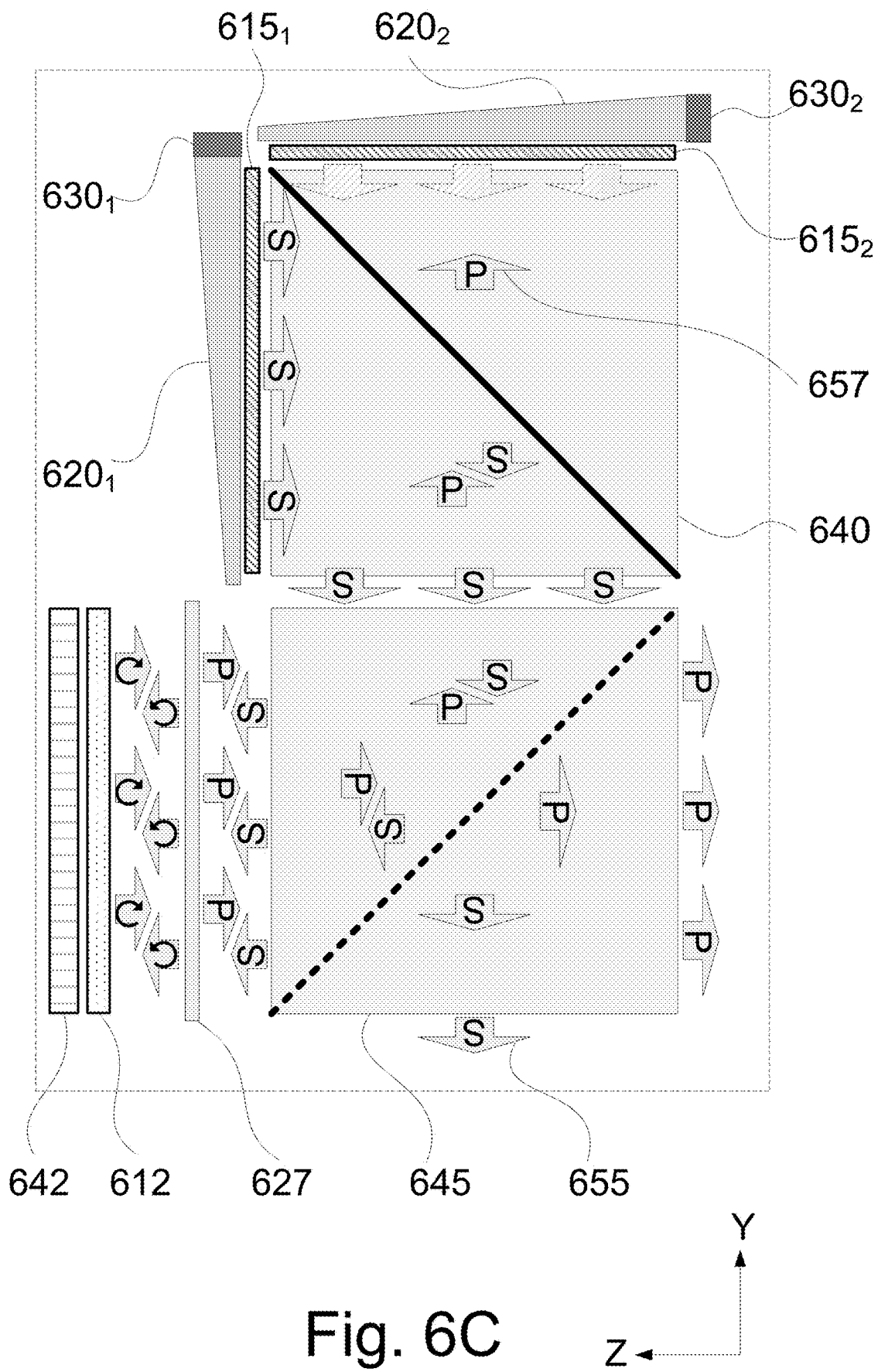
Figure 6D:
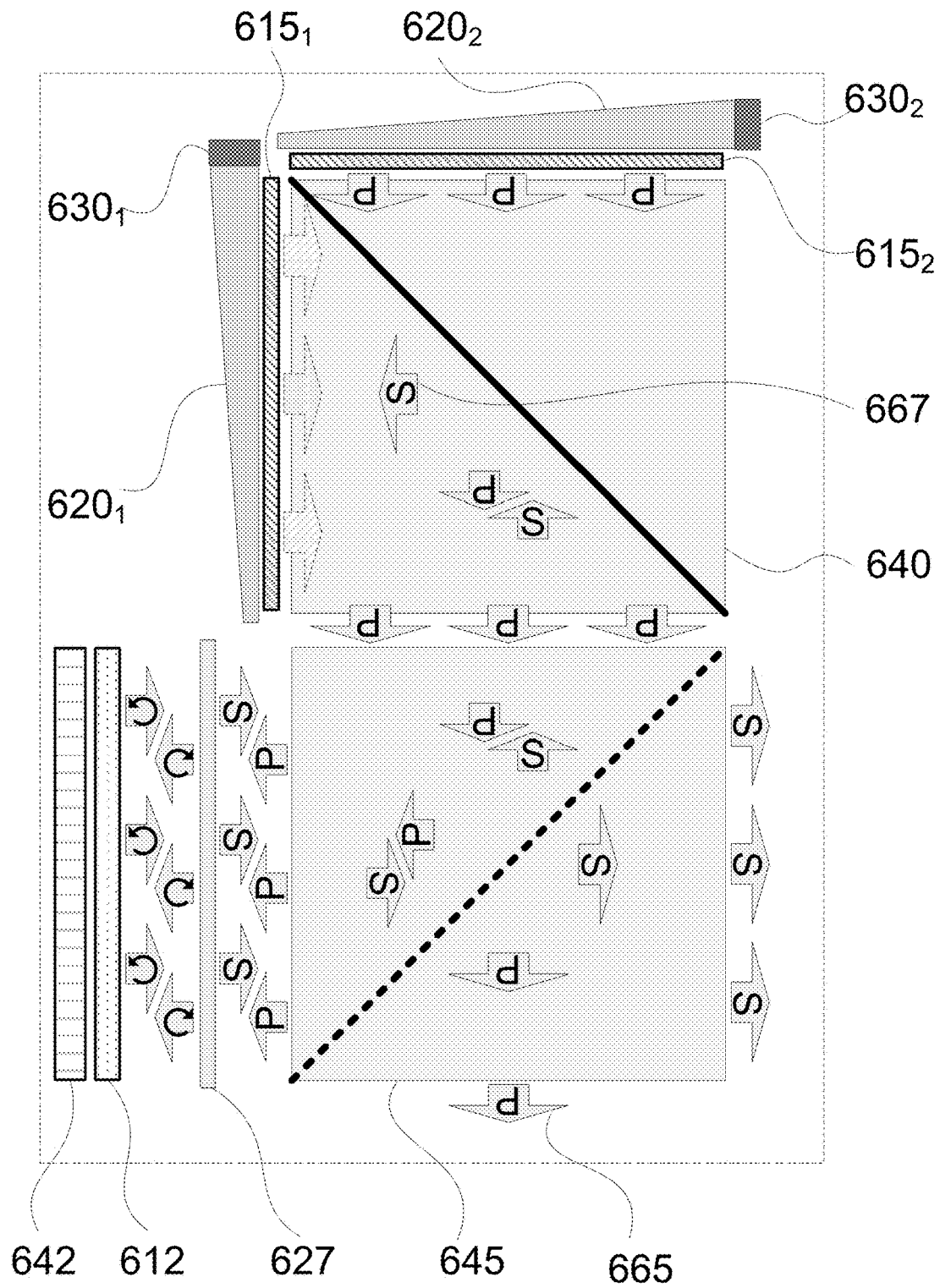

As indicated above, in addition to providing wavelength segregated RGB sets, polarization segregated sets of RGB illumination may be used to provide different focal plane distances by the wearable AR display system. FIGS. 6C and 6D schematically illustrate the implementation of a multiple backlight illumination source with two sets of polarization segregated RGB illumination.

As shown in FIGS. 6C and 6D, which describe two states of the same display arrangement, the display system includes a first illumination source $630_1$, a first waveguide $620_1$, and a first polarizer $615_1$ arranged in a first orientation (e.g., generally parallel to the y-axis of FIGS. 6C and 6D). In addition, a second illumination source $630_2$, a second waveguide $620_2$, and a second polarizer $615_2$ are arranged in a second orientation orthogonal to the first orientation of the first illumination source $630_1$, the first waveguide $620_1$, and the first polarizer $615_1$ (e.g., generally along the z-axis of FIGS. 6C and 6D). In this example, the light sources are implemented using two sets of RGB LEDs centered about the same wavelengths.

Each set of RGB illumination is homogenized and distributed with the respective first or second homogenizing-distributing waveguides. Light emitted from each waveguide passes through a respective first or second polarizer $615_1$ and $615_2$ to polarize the two sets of RGB illumination with orthogonal polarizations. For example, the polarizations of each set of illumination can be either orthogonal linear polarization states or orthogonal circular polarization states. By way of example FIGS. 6C and 6D show the polarizations as s-linear polarization and p-linear polarization, respectively; however, one skilled in the art will appreciate that any other combination of orthogonal polarizations can be used consistent with the teachings and example given herein.

A polarization beam-splitter 640 is configured to direct the light emitted from each waveguide with either polarization towards the display 642 via a combining beam-splitter 645. One source of illumination (e.g., light emitted from waveguide $620_2$) is input on the face of the polarizing beam-splitter 640 opposite the combining beam-splitter 645 and traverses the polarized coating in the polarizing beam-splitter 640. The other source of illumination (e.g., light emitted from the waveguide $620_1$) is input on the face of the polarizing beam-splitter 640 perpendicular to the combining beam-splitter 645 and is reflected by the polarized coating of the polarizing beam-splitter 640. Light from either source is then reflected by the combining beam-splitter towards the display 642. In this manner, the two orthogonal polarized backlight illuminations can intermittently illuminate the combining beam-splitter 640 and the display 642. The display 642 is a non-polarizing spatial light modulator, such as a vibrating mirror.

As shown in FIG. 6C, the path of the s-polarized backlight may be described as follows. The s-polarized light (e.g., light emitted from the waveguide $620_1$ and polarizer $615_1$ combination) is reflected by the polarization beam-splitter 640 towards the combining beam-splitter 645. The s-polarized light is then partly (e.g., approx. 50%) reflected by combining beam-splitter 645 towards display 642 (e.g., the reflective spatial light modulator); the complementary portion 655 (e.g., again approx. 50%) is transmitted through the combining beam-splitter 645 exiting on the opposite face of the beam splitter 645. In one example, the illumination 655 transmitted through the combining beam-splitter 645 can be absorbed by a suitable mask or corrugated baffle (not shown) to prevent, for example, stray light from interfering with the quality of the image generated by the display system.

The s-polarization light incident towards the display 642, passes a quarter wave-plate 627, which converts the polarization to a circular polarization (e.g., counterclockwise polarization) and after reflection from the display 642 passes the quarter wave-plate 627 to be output as p-polarized light. The p-polarized light, now modulated as an image, is partly (e.g., approx. 50%) transmitted by combining beam-splitter 645 and output from the display system to the associated optics system 120 to create the synthetic image for viewing by the user, and the complementary portion 657 (e.g., again approx. 50%) is reflected by the combining beam-splitter 645 back towards the second backlight illumination source $620_2$. The reflected complementary portion 657 of the illumination has polarization that is orthogonal to the incident backlight and therefore traverses the polarizing beam-splitter 640 towards the orthogonal polarizer (in this example $615_2$) where the light can be redirected to an absorber such as a mask or a corrugated baffle (not shown). In one example, the complementary illumination 657 may be redirected by slanting the beam-splitter to reflect the complementary light off (not indicated in the figure). In another example, the complementary light may be removed from the display system using a polarization-dependent absorber (not shown).

FIG. 6D shows the path of the p-polarized backlight. The p-polarized light is transmitted by the polarization beam-splitter 640 towards the combining beam-splitter 645. The p-polarized light is then partly (e.g., approx. 50%) reflected by combining beam-splitter 645 towards the display 642 (e.g., a reflective spatial light modulator), and the complementary portion 665 (e.g., again approx. 50%) is transmitted through the combining beam-splitter 645 and exits the opposite face of the beam splitter 645. In one example, this complementary illumination 665 can be absorbed by a suitable mask or corrugated baffle (not shown) to prevent, for example, stray light from interfering with the quality of the image generated by the display system.

The p-polarization light incident towards the display 642, passes the quarter wave-plate 627, which converts the polarization of the light to a circular polarization (e.g., clockwise polarization). After reflection from the display, the light passes the quarter wave-plate 627 and is output as s-polarized light. The s-polarized light modulated as an image is also partly (e.g., approx. 50%) transmitted by combining beam-splitter 645 and output from the display system to the associated optics system (not shown) to create the synthetic image for viewing by the user. The complementary portion 667 (e.g., again approx. 50%) is reflected by the combining beam-splitter 645 towards the polarization beam-splitter 640 and is reflected toward the first backlight illumination source. The reflected, complementary portion 667 of the illumination is orthogonal in polarization to the incident backlight and therefore is directed by the polarizing beam-splitter towards the orthogonal polarizer $615_1$ where the light can be redirected to an absorber, such as a mask or a corrugated baffle. In one example, the complementary illumination 667 may be redirected by slanting the beam-splitter to reflect the complementary light (not indicated in the figure). In another example, the complementary light 667 may be removed from the display system using a polarization-dependent absorber.

The arrangement shown in FIG. 6C or 6D allows the display (e.g., a reflective spatial light modulator) to generate images having different polarizations that are provided to associated optics which select a specific focal plane distance to form a synthetic image in 3D. Use of this arrangement results in a loss of light from each illumination source reducing the amount of backlight provided by this arrangement as compared, for example, with a standard backlight and LCD. However, unlike the examples shown in associated with FIGS. 6A and 6B, the arrangement is able to use an illumination source centered at the same wavelengths. Such a tradeoff may be desired for certain implementations, both with respect to the accurate overlap of the color gamut of two images in addition to using backlights centered at the same wavelengths. Furthermore, in some implementations use of a corresponding a polarization filter coating of the optics system may result in lower cost when compared to use of a tri-chromatic filter coating.

Figure 6E:
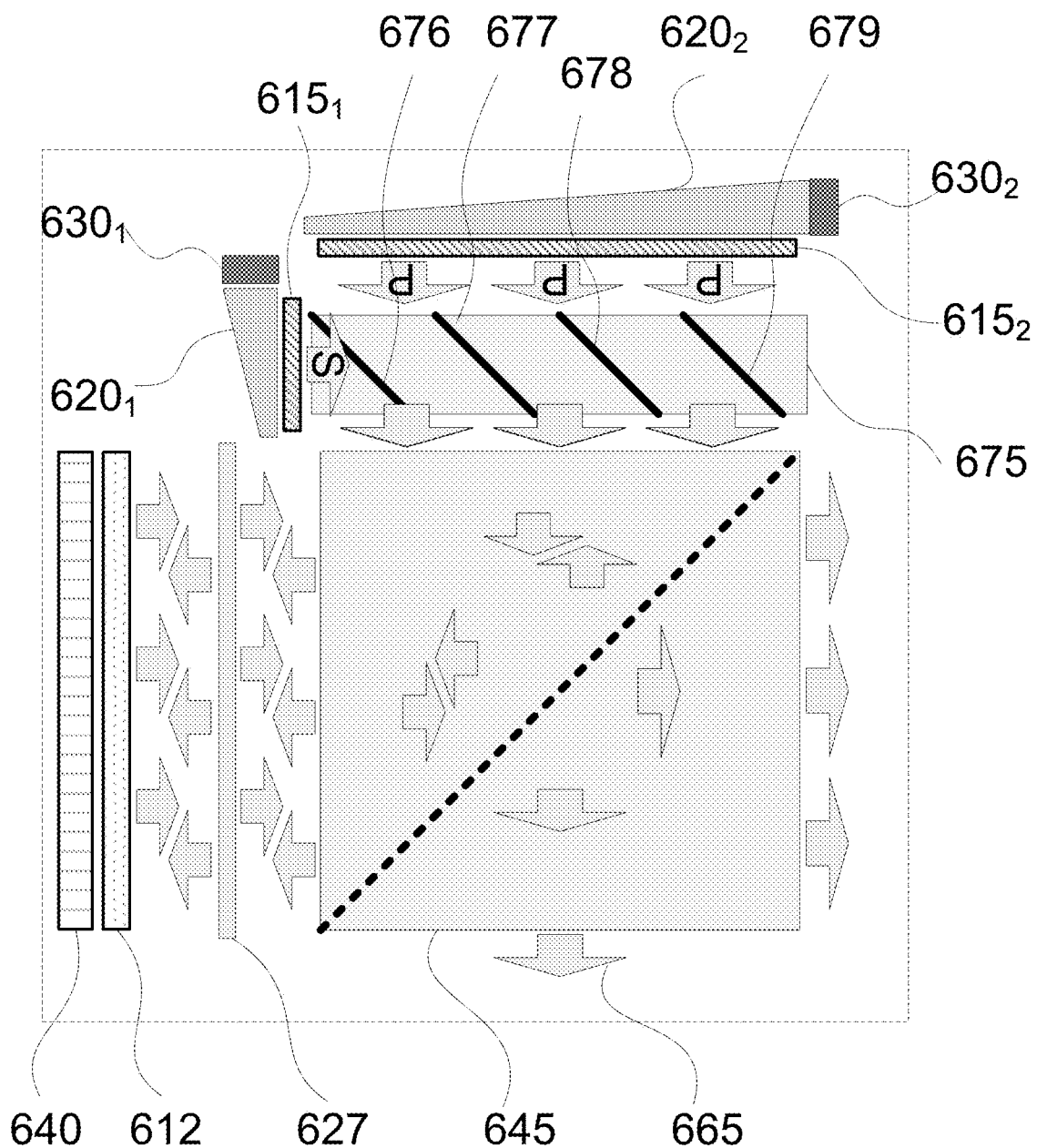

FIG. 6E shows another example of a display system. As shown in FIG. 6E, the display system includes a first illumination source $630_1$, a first waveguide $620_1$, and a first polarizer $615_1$ arranged in a first orientation (e.g., generally parallel to the y-axis of FIG. 6E). In addition, a second illumination source $630_2$, a second waveguide $620_2$, and a second polarizer $615_2$ are arranged in a second orientation orthogonal to the first orientation of the first illumination source $630_1$, the first waveguide $620_1$, and the first polarizer $615_1$ (e.g., generally along the z-axis of FIG. 6E). In this example, the light sources are implemented using two sets of RGB LEDs centered about the same wavelengths.

Each set of RGB illumination is homogenized and distributed with the respective first or second homogenizing-distributing waveguides. Light emitted from each waveguide passes through a respective first or second polarizer $615_1$ and $615_2$ to polarize the two sets of RGB illumination with orthogonal polarizations. For example, the polarizations of each set of illumination can be either orthogonal linear polarization states or orthogonal circular polarization states. By way of example FIG. 6E shows the polarizations as s-linear polarization and p-linear polarization, respectively; however, one skilled in the art will appreciate that any other combination of orthogonal polarizations can be used consistent with the teachings and example given herein.

The display system shown in FIG. 6E is similar to that shown in FIGS. 6C and 6D; however, the larger, single polarizing reflecting surface of the polarizing beam splitter 640 used in the example shown in FIGS. 6C and 6D is replaced with a smaller polarizing beam splitter 675 having multiple polarizing reflecting surfaces to provide a more compact backlight arrangement. The multiple polarizing reflecting surfaces of the beam splitter 675 are configured to direct the light emitted from each waveguide with either polarization towards the display 640 via the combining beam-splitter 645. For example, one source of illumination (e.g., light emitted from waveguide $620_2$) is input on the multiple faces of the polarizing beam-splitter 675 opposite the combining beam-splitter 645 and traverses the polarized coatings in the polarizing beam-splitter 675. The other source of illumination (e.g., light emitted from the waveguide $620_1$) is input on the multiple faces of the polarizing beam-splitter 675 perpendicular to the combining beam-splitter 645 and are reflected by the polarized coatings of the multiple reflecting surfaces of the polarizing beam-splitter 640. In this example, the reflectivity of each additional reflecting surface grows geometrically. For example, when four reflecting surfaces are provided by the beam splitter 675, in order of closest to the first backlight to the furthest from the first backlight, the first surface 676 reflects a ¼, the second surface 677 a ⅓, the third surface 678 a ½, and the last surface 679 a 100% to provide each a uniform 25% intensity of the first source of illumination $630_1$. In addition, according to this example, the transmission values (e.g., for p-polarization in this example) of the faces (e.g., 676-679) should have the same level, and the intensity of the second backlight should be adjusted such that the light of each polarization provided to the system have similar intensities. Otherwise, the operation of this arrangement is the same as that described above for FIGS. 6C and 6D (and in the interest of brevity is not repeated) to generate images having different polarizations that are provided to associated optics which select a specific focal plane distance to form a synthetic image in 3D.

Figure 6F:
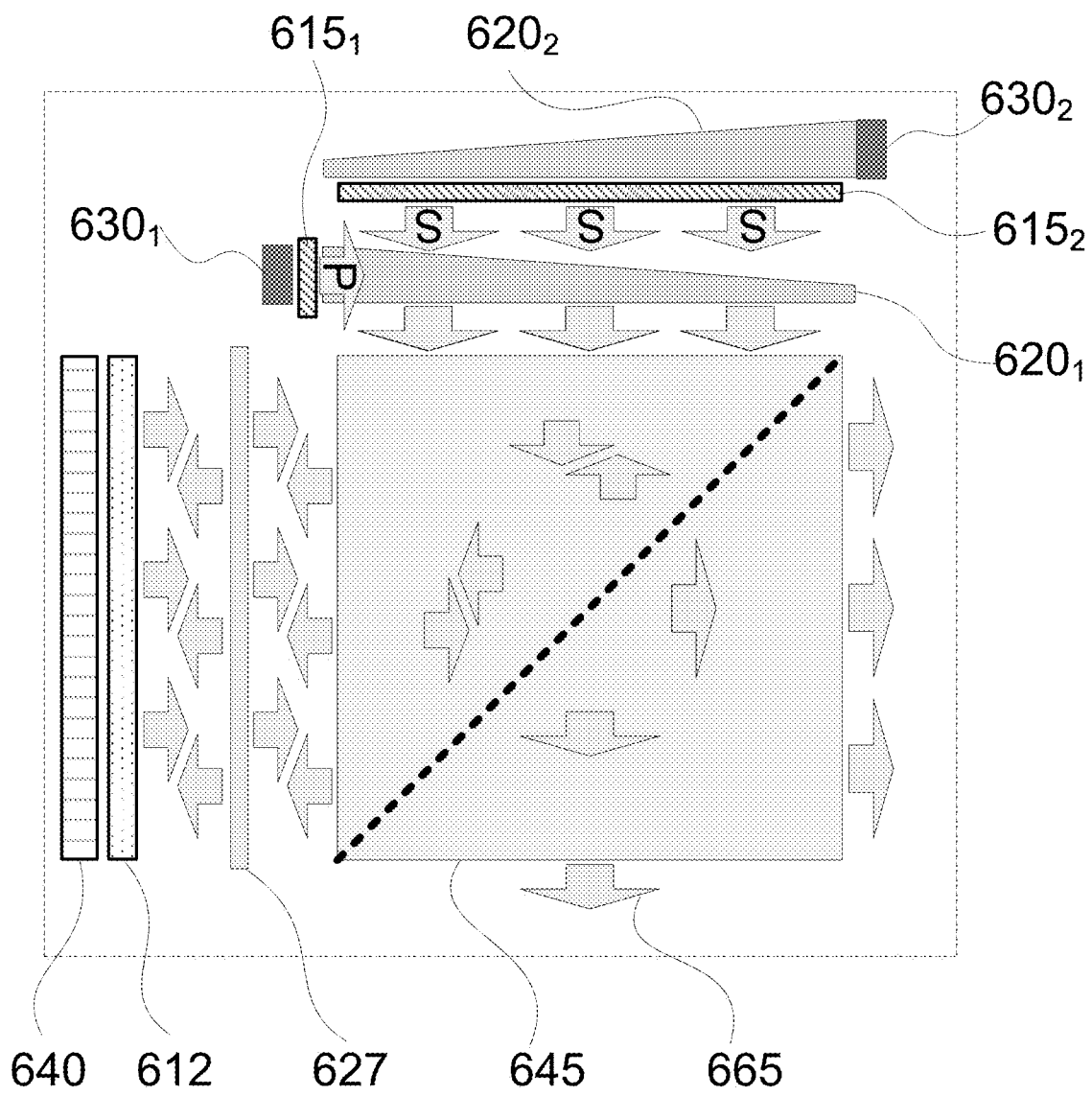

FIG. 6F shows another example of a display system. As shown in FIG. 6F, the display system includes a first illumination source $630_1$, a first waveguide $620_1$, and a first polarizer $615_1$ arranged in a first orientation (e.g., generally parallel to the z-axis of FIG. 6F). In addition, a second illumination source $630_2$, a second waveguide $620_2$, and a second polarizer $615_2$ are also arranged along the first orientation (generally parallel to the z-axis of FIG. 6F) adjacent to the first waveguide $620_1$; however, the end of the second waveguide $620_2$ including the second source of illumination $630_2$ is provided opposite to the end of the first waveguide $620_1$ including the first illumination source $630_1$. In this example, the light sources are implemented using two sets of RGB LEDs centered at the same wavelengths.

Each illumination source is homogenized and distributed with the respective first or second homogenizing-distributing waveguide. However, unlike the preceding examples shown in FIGS. 6A-6E, light emitted from the first illumination source $630_1$ passes through the first polarizer $615_1$ prior to entering the first waveguide $620_1$, while light from the second illumination source $630_2$ is homogenized by the second waveguide $620_2$ and then distributed to the second polarizer $615_2$. The light from the latter source is well polarized. The light from the first source is perfectly polarized on entry to the homogenizing-distributing waveguide $620_1$. Although in principle there may be some depolarization of the light due to reflections within the waveguide $620_1$, such are minor for p-polarized light. Therefore, this arrangement, although conceptually imperfect, ensures that each of the illumination sets of each of the backlights are sufficiently polarized in practice, and that the two polarizations are orthogonal. This arrangement is significantly simpler to implement, for example, eliminating the need for a polarizing beam splitter, thus offering a lower cost solution, although with some compromised performance to be considered as a practical tradeoff of implementation in specific instances.

Apart for the differences in the configuration of the backlights, the operation of the arrangement shown in FIG. 6F is otherwise similar to that the system shown in FIGS. 6C and 6D to generate images having different polarizations that are provided to associated optics which select a specific focal plane distance to form a synthetic image in 3D. However, the performance of this arrangement differs from the systems shown in FIGS. 6C, 6D, and 6E in two respects. For example, in this arrangement the polarization of the first illumination source $630_1$ may be imperfect due to some scattering of the polarized light by the first homogenizing-distributing waveguide $620_1$. In addition, the reflected complimentary portion of illumination have the first polarization is directed towards an orthogonal polarizer $615_2$ where it can be suitably attenuated or redirected; however, the reflected complimentary portion of illumination having the first polarization is also directed towards the second polarizer $615_2$. As a result, the reflected complimentary portion of illumination having the first polarization may not be removed or redirected in the same manner as described above for FIGS. 6C and 6D. Nevertheless, reflected complimentary portion of illumination having the first polarization is scattered by the first homogenizing-distributing waveguide thereby minimize any effect. Although this arrangement differs in the respects detailed above, it may be preferable alternative under certain circumstances and/or design criteria.

Figure 6G:
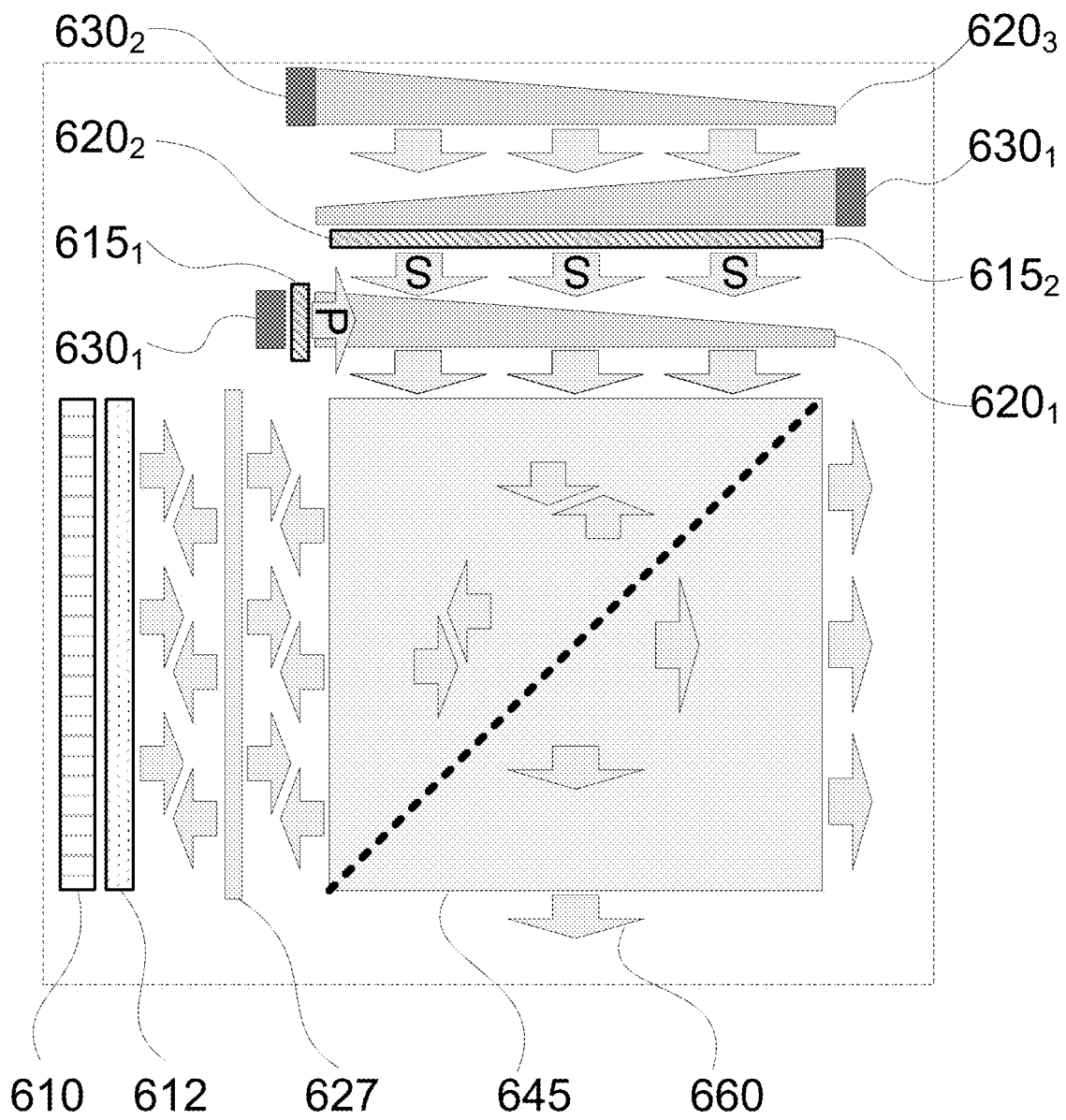

FIG. 6G shows another example of a display system including a combination of wavelength and polarization set multiplexing. As shown in FIG. 6G, the display system includes the configuration of the first and second polarization backlights shown in FIG. 8F; however, an additional third backlight also is provided. The third backlight includes a third illumination source $630_3$. In this example, the third illumination source $630_3$ is a set of RGB LEDs centered at wavelengths that differ from the center of the wavelengths for the sets of RGB LEDs implementing the first and second illumination sources $630_1$ and $630_2$. In addition, the third backlight includes a third homogenizing-distributing waveguide $620_3$ that is arranged along the first orientation (generally parallel to the z-axis of FIG. 6F) adjacent to the second waveguide $620_2$. The end of the third waveguide $620_3$ including the third source of illumination $630_3$ is provided, for example, opposite to the end of the second waveguide $620_2$ including the second illumination source $630_2$ and at the same end of the first waveguide $620_1$ including the first illumination source $630_1$. Other relative orientations between these waveguides are possible as discussed above with relation to the system of FIGS. 5A and 5B.

As described above, the homogenizing-distributing waveguides $620_2$ and $620_3$ rely primarily on total internal reflection so the waveguides are made essentially transparent to light radiated perpendicular to the broad dimension (e.g., x-y plane of the base of the waveguide). When stacked adjacent to each other, the illumination from the third waveguide $620_3$ passes through the second waveguide $620_2$. The light emitted from the both the second and the third waveguide, each having two different sets of RGB wavelengths, are polarized into s-type polarized illumination by the second polarizer $615_2$. However, apart from the additional set of RGB LEDs of the third backlight centered at different wavelength, the operation of this arrangement is similar to that of FIG. 8F providing an output image with two multiplexed polarizations an two multiplexed sets of RGB wavelengths, for a total of three different RGB sets that are provided to the associated optics system, which selects among three different focal plane distances corresponding to the three sets to form a synthetic image in 3D.

One skilled in the art will note that the choice of the arrangement of FIG. 6F as the polarization multiplexing arrangement to which the additional backlight is added is exemplary only. For example, the addition of a third backlight as shown in FIG. 8G can also be added to modify any of the arrangements shown in FIGS. 8C, 8D, and 8E to provide an additional two multiplexed sets of RGB wavelengths. It will also be appreciated that components other than those provided schematically in FIGS. 6A-6G to illustrate the concept may have been omitted for conciseness and clarity. For example, a display system may include additional components such as an input, a power source, and other components. Specifically, reflective spatial light modulators are typically small and require magnifying optics to enlarge the image. This is affected by the curvature of the combiner-reflector optics that are included in each arrangement, similarly to the elements $120_i$ of FIG. 1, which are not shown in FIGS. 4A-4B, 5A-5B and 6A-6G in the interest of conciseness.

Figure 7A:
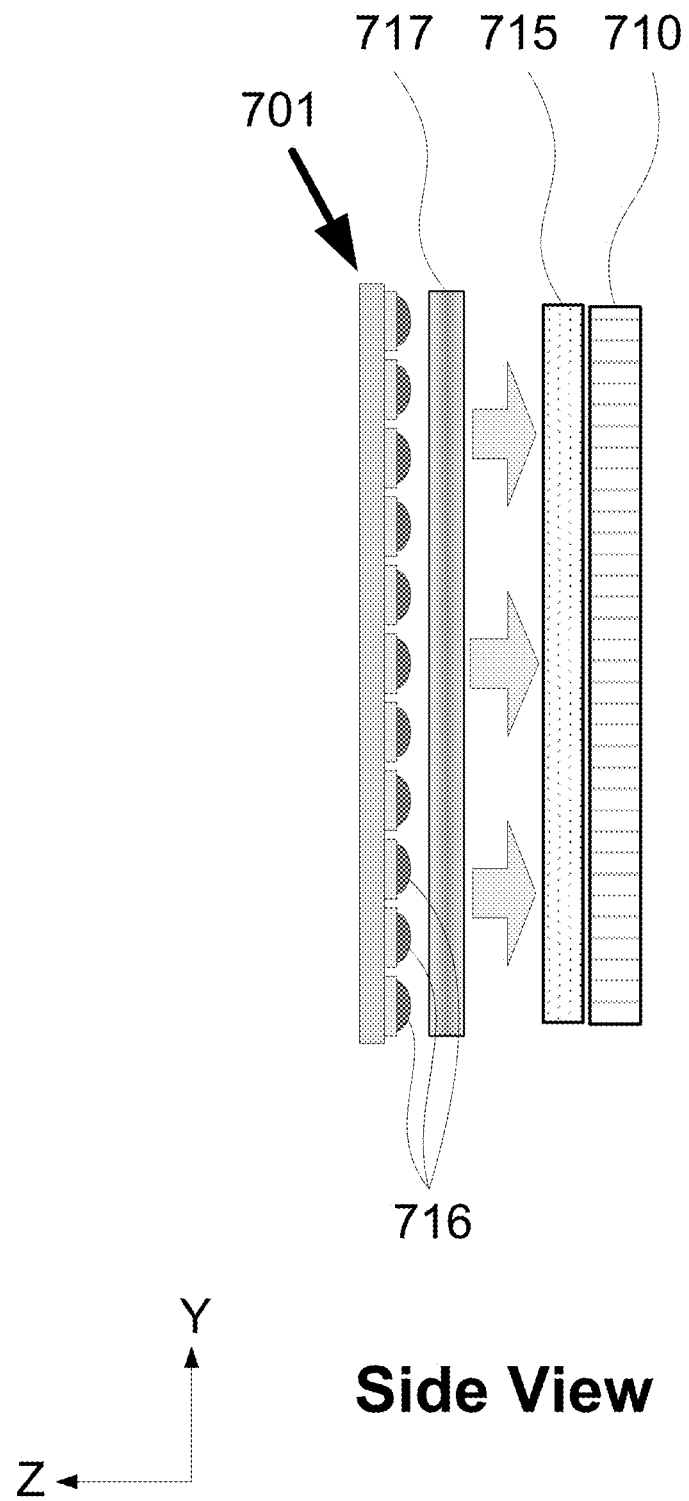
FIG. 7A is a side view of a display system with an LED back-illumination array.

FIG. 7A shows a side view of another example of a display system 110. As shown in FIG. 7A, the display system includes a wavelength multiplexed backlight 701 (a first example of which is shown in the plan view of FIG. 7B), a filter 715, and a display 710. In this example, the wavelength multiplexed backlight includes an illumination source 716 and a diffuser 717. The illumination source 716 is implemented using a flat panel of RGB LEDs 730 which illuminates the diffuser 717 to homogenize the backlight illumination. In this example, the display 710 is an LCD display, and the filter 715 is a color filter arranged between the backlight 701 and the display 710.

Figure 7B:
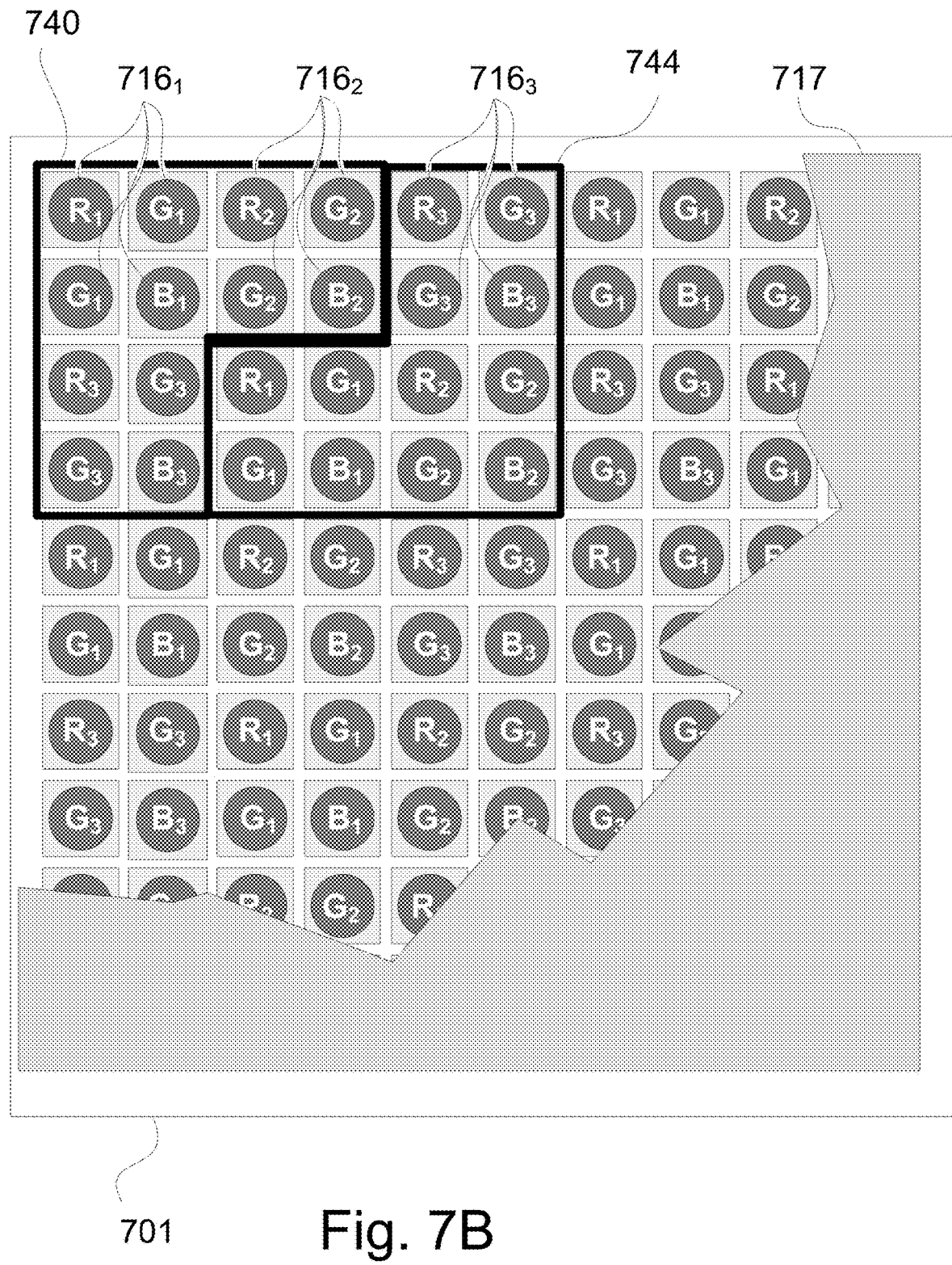
FIGS. 7B and 7C are examples of the distribution arrangements of a back-illumination array for the display in FIG. 7A.
Figure 7C:
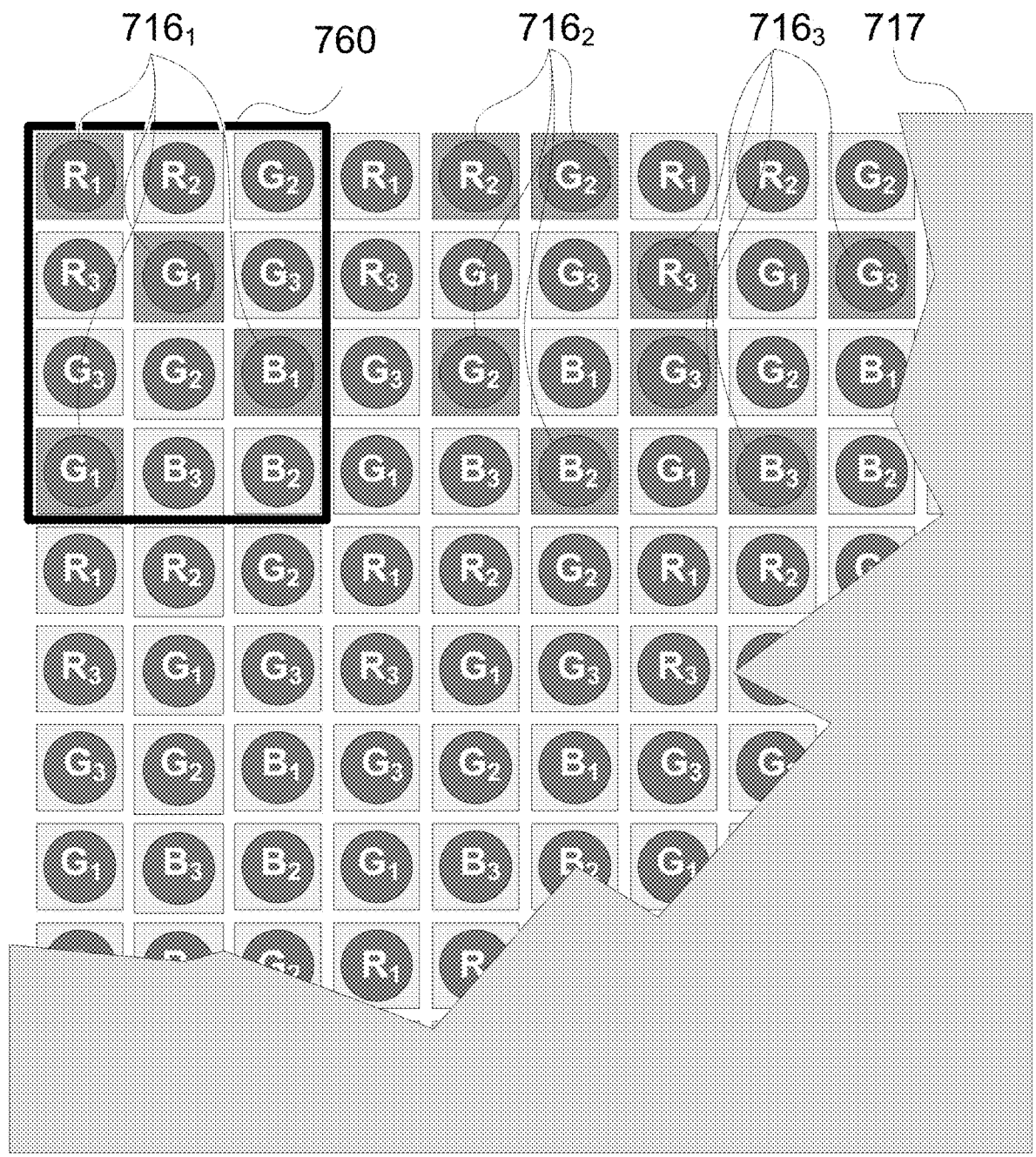

The display system includes a wavelength multiplexed backlight 701 that illuminates the display 710 with the two or more sets of RGB illumination sources. In the example shown in FIG. 7B there are three sets of RGB LEDs 730 centered at different wavelengths (e.g., the sets $RGB_1$, $RGB_2$ and $RGB_3$ as shown in FIG. 2) that implement the wavelength multiplexed backlight 701. Each set of wavelengths is denoted by a 1, 2, or 3. For example, as shown in FIGS. 7B and 7C, a first set is made up of all LEDs denoted $R_1$, $G_1$, $B_1$, a second set is made up of all LEDs denoted $R_2$, $G_2$, $B_2$, and a third set is made up of all LEDs denoted $R_3$, $G_3$, $B_3$. Each individual LED color is arranged to illuminate the LCD uniformly.

As shown in FIG. 7B, like-colored LEDs of the same wavelength set may be arranged to be located as close as possible to one another to form groups of one R, one B, and two G LEDs. Three groups of LEDs, each of which is centered at a different set of wavelengths, forms a single cell. One such arrangement of a cell of LEDs is shown in FIG. 7B. For example, a first cell 740 includes three square groups that form an L-shape, which may be paired with another complementary cell 744 also having an L-shape. The two cells 740 and 744 may be arranged such that together they form a rectangle. The two complimentary L-shape cells arrangement is repeated in rows over the entire backlight panel 701. In this example, the two L-shaped basic geometric repetitive cells 740 and 744 are interlaced to form a combined array of 6 pixels wide and 4 pixels high. As shown, each L-shaped filter includes three red pixels, 6 green pixels, and 3 blue pixels. A complimentary arrangement, with similar L-shaped cell geometries which are 4 pixels wide and 6 pixels high is also possible.

FIG. 7C shows another example of an arrangement for configuring a panel 701 with three sets RGB wavelengths for use in the system shown in FIG. 7A. In this example there is a single repetitive cell arrangement. For example, a cell 760 includes twelve LEDs (e.g., $R_1$, $G_1$, $G_1$, $B_1$, $R_2$, $G_2$, $G_2$, $B_2$, $R_3$, $G_3$, $G_3$, and $B_3$) irregularly distributed to form a rectangular cell. The cell 760 is repeated over the entire backlight panel 716. The less ordered arrangement of filters may avoid the introduction of any visible periodic artifacts in the display attributable to a more orderly distribution of pixels. As shown, each filter cell 760 includes twelve filters corresponding to three red pixels, six green pixels, and three blue pixels of the display. In this example, the basic repetitive filter arrangement cell geometry is a 3-pixel wide by 4-pixel high repetitive cell. A complimentary arrangement, which is 4 pixels wide and 3 pixels high, is also possible. The pixels that are active in each illuminated image corresponding to a different focal distance are respectively highlighted in the top three 3×4 filter arrangement geometry cells. One skilled in the art will appreciate that other arrangements of the filters within a cell are possible.

As shown in FIG. 7A, the display system includes a color filter array 715 arranged adjacent to the display 710 to illuminate the relevant pixels of the display 710 with the backlight sets provided from the wavelength multiplexed backlight 701. The individual filters of the color filter array 715 have sufficiently broad bandwidths to transmit each primary color (e.g., red, green, or blue) of the sets of RGB wavelengths.

In this arrangement the RGB LEDs of the backlight 701 are fired sequentially and in synchronism with the activation of the relevant color pixels, for example, as directed by the input from a graphics processor (not shown). Although such sequenced firing is not mandatory, it improves the contrast of the display, reduces power consumption, and addresses the issue of heat removal. In addition, the display system provides different focal plane distances when paired with a corresponding optics system using the different sets of RGB LEDs that are multiplexed by the different set of RGB wavelengths. This, for example, allows to form a 3D image with suitable focal distance.

Figure 8A:
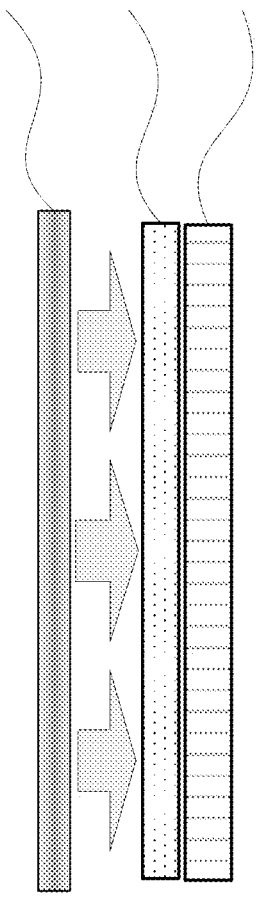
FIG. 8A shows a side view of a display system with color filter array with a white backlight.

FIG. 8A shows a side view of another example of a display system 110 using a white light backlight. In this example, a color filter 805 is provided between a backlight 807 and a display 810. In this example, the display 810 may be implemented using an LCD array, and the backlight 807 may be a white backlight, for example, a cold-cathode white light. The illumination from the white backlight 807 is filtered by the color filter 805 to frequency multiplex the backlight illumination provided to the display between two or more sets of RGB illumination. For example, the color filters include of two or more sets of filter bands corresponding to the different RGB color sets to be implemented.

Figure 8B:
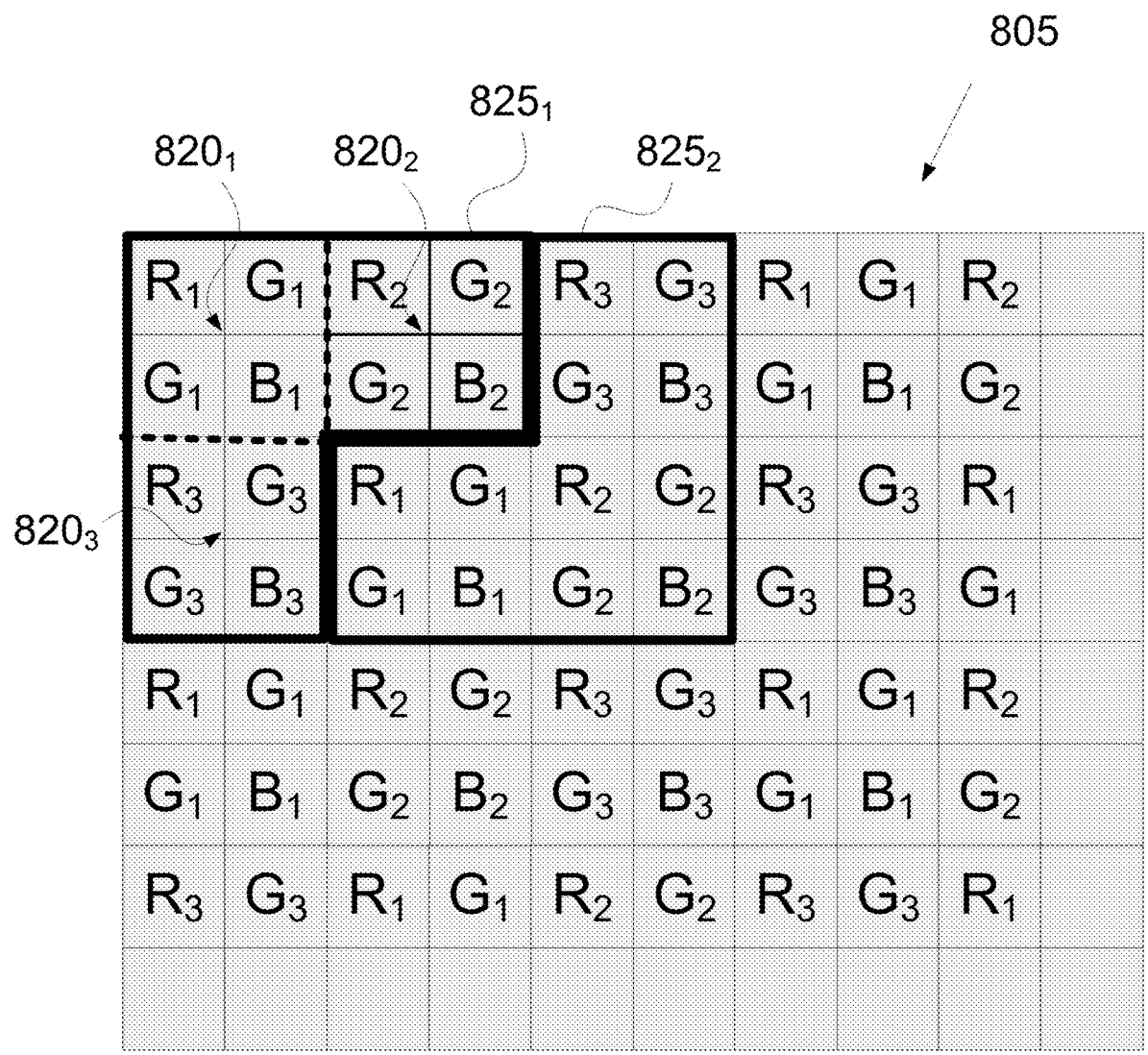
FIGS. 8B and 8C show examples of arrangements for a color filter arrays for the display in FIG. 8A.

The color filter 805 includes a plurality of R, G, and B color filters. FIG. 8B shows an example of a first arrangement of color filters within the filter 805 for use in the system shown in FIG. 8A. As shown in FIG. 8B, the filter is an RGB filter having a repetitive arrangement of sets of filters grouped into cells. Each cell includes two or more sets of filter bands corresponding to two more focal distances. In this example, three sets of filter bands are used to implement three display depths. As shown in FIG. 8B, each set of bands is denoted by a 1, 2, or 3. For example, a first set is made up of all filters denoted $R_1$, $G_1$, $B_1$, a second set is made up of all filters denoted $R_2$, $G_2$, $B_2$, and a third set is made up of all filters denoted $R_3$, $G_3$, $B_3$. As a result, a minimum of nine filters for: $RGB_1$, $RGB_2$ and $RGB_3$ may be used in a cell. Each individual filter is arranged to illuminate a corresponding pixel of the LCD array.

As shown in FIG. 8B, filters of the same set of bands are arranged as close as possible to one another to form groups 820, including a red filter, a blue filter, and two green filters to accommodate the higher luminosity required in the green spectrum. In this example, three groups of filters form a single cell 825. FIG. 8B shows one such arrangement of a cells including a first cell $825_1$ and a second cell $825_2$. The first cell $825_1$ includes three square groups of filters that combine to form an L-shape. The first cell $825_1$ may be paired with another complementary cell $825_2$ also having an L-shape. The two cells $825_1$ and $825_2$ may be arranged such that together they form a rectangle. The two complimentary L-shape cells arrangement is repeated in rows over the entire filter 805.

In this arrangement, only one-third of the pixels of the display are used for each focal plane distance, which may result in a reduction in pixel resolution for a given display geometry. It is noted that in the case of a white light backlight, the backlight itself is illuminated continuously, and the RGB image sets are sequenced through the red, green and blue pixels for each image depth. In this example, the two L-shaped basic geometric repetitive cells $825_1$ and $825_2$ are interlaced to form a combined array of 6 pixels wide and 4 pixels high. As shown, each L-shaped filter includes three red pixels, 6 green pixels, and 3 blue pixels. A complimentary arrangement, with similar L-shaped cell geometries which are 4 pixels wide and 6 pixels high is also possible.

Figure 8C:
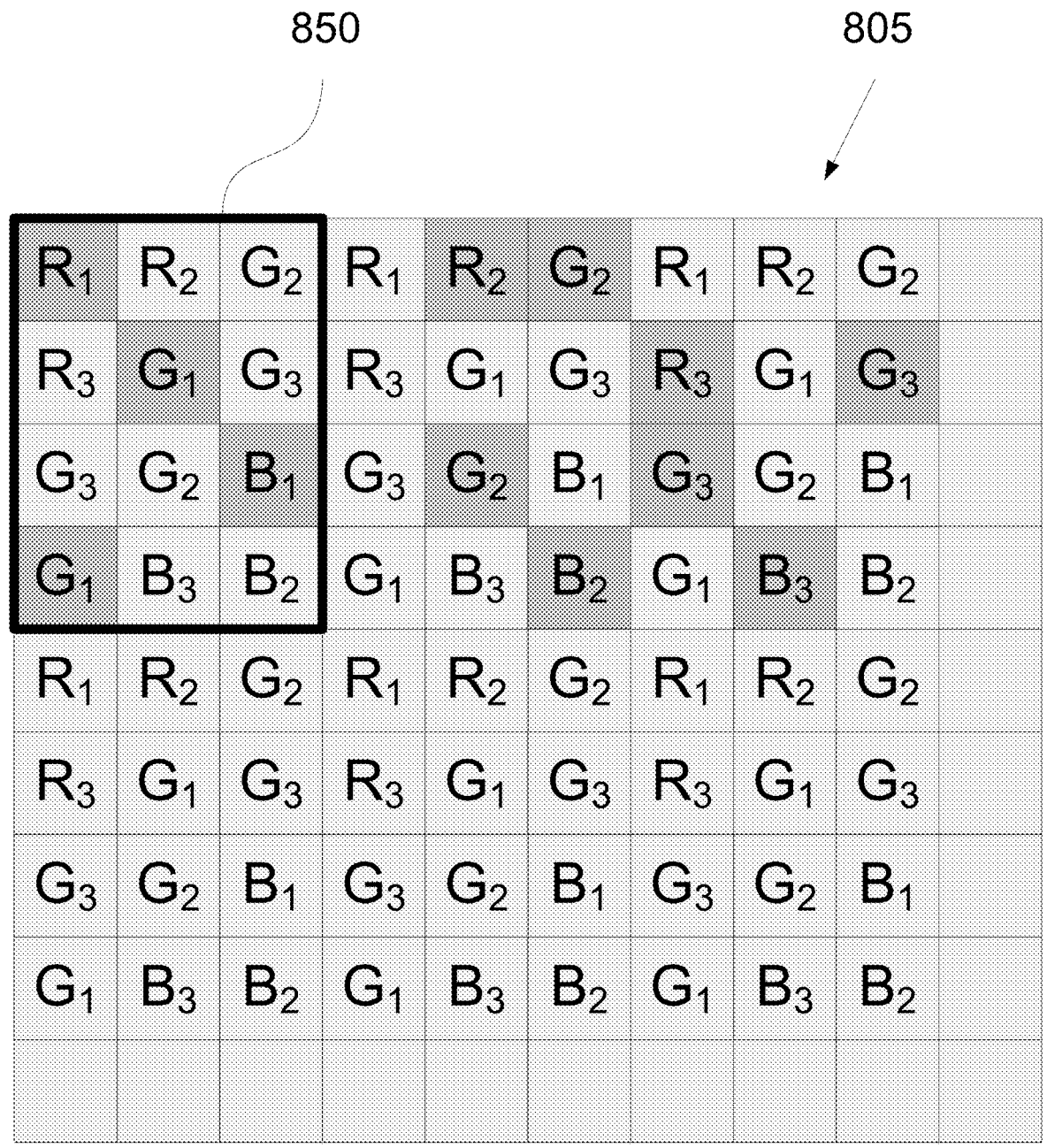

FIG. 8C shows another example of a filter 805 for use with the system of FIG. 8A. In this example, three sets of filter bands also are used to implement three display focal distances corresponding to $RGB_1$, $RGB_2$ and $RGB_3$; however, a different multi-RGB filter set distribution is provided. As shown in FIG. 8C, the individual color filters for each set are provided in a less ordered arrangement than the arrangement shown in FIG. 8B. The less ordered arrangement of filters may avoid the introduction of any visible periodic artifacts in the display attributable to a more orderly distribution of pixels. As shown, each filter cell 850 includes twelve filters corresponding to three red pixels, 6 green pixels, and 3 blue pixels of the display. In this example, the basic repetitive filter arrangement cell geometry is a 3-pixel wide by 4-pixel high repetitive cell. A complimentary arrangement, which is 4 pixels wide and 3 pixels high, is also possible. The pixels that are active in each illuminated image corresponding to a different focal distance are respectively highlighted in the top three 3×4 filter arrangement geometry cells. One skilled in the art will appreciate that other arrangements of the filters within a cell are possible.

Instead of, or in addition to, using the frequency multiplexing afforded by multiple RGB filters shown in the examples provided by FIGS. 8B and 8C, polarization multiplexing on different pixels may be used by introducing a pixel-wise variation in polarization. In the following examples, the polarization of each pixel of an image may be assigned one of two orthogonal polarization states. In this manner, approximately half the pixels of the image are assigned one polarization and the other half an orthogonal polarization. The two orthogonal polarization states are alternated between adjacent pixels, and the different polarization states for each pixel are activated sequentially. Such polarization distribution reduces the basic resolution of the corresponding display 810. Each polarization state is used to select a single optical imaging surface, so that two different focal plane distances can be controlled by selecting a suitable polarization state for each pixel.

Figures 8D, 8E:
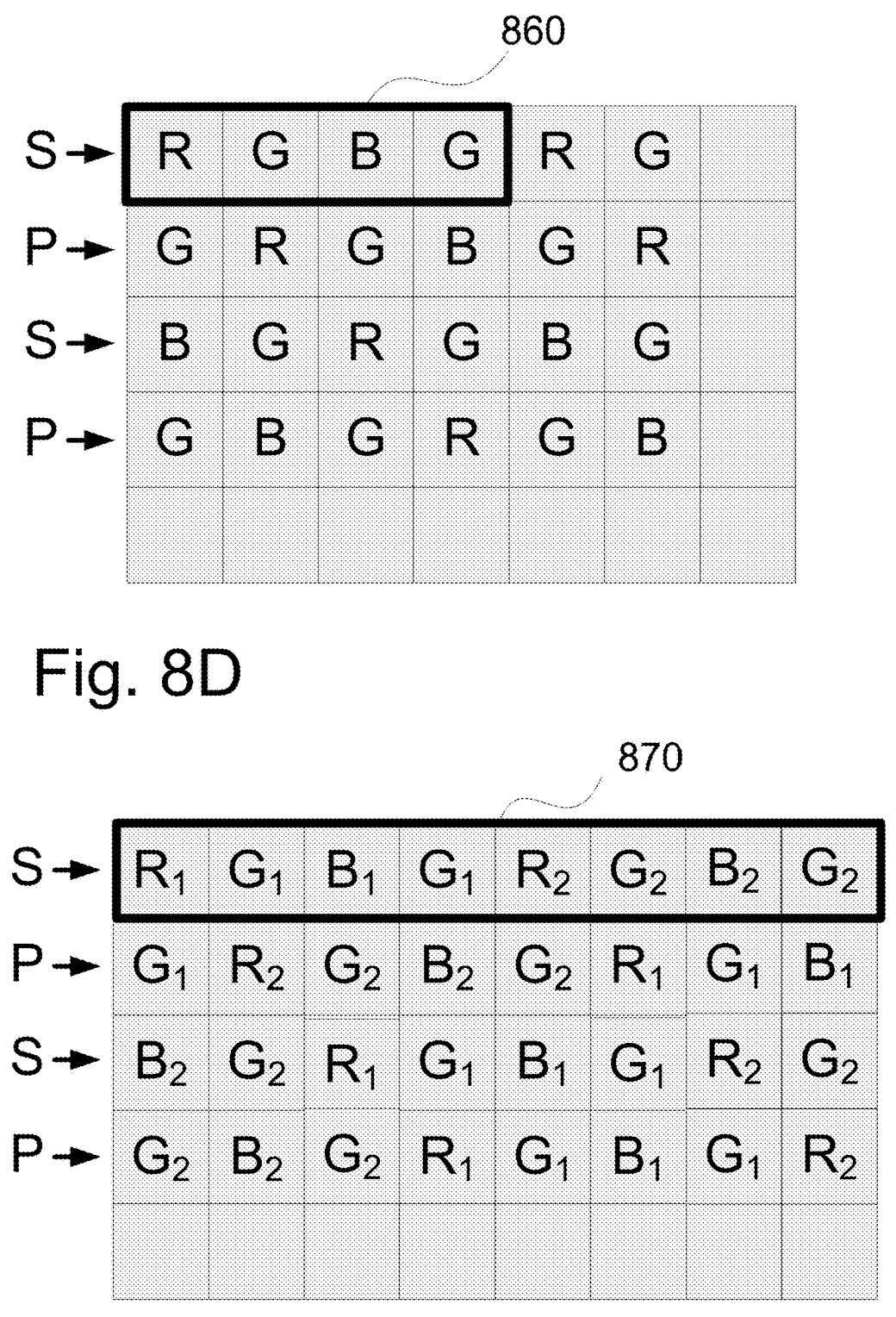

FIG. 8D shows one example of a polarization multiplexing implementation of the filter 805. In this example, the RGB filters are arranged in rows of repeating cells 860. Each cell 860 includes one red filter, one blue filter, and two green filters forming a 4-pixel wide by 1-pixel high rectangle. Different orthogonal polarizations are associated with alternating rows of the filter 805. In this example, s-type and p-type linear polarizations are shown; however, any two orthogonal polarization states may be used (e.g., circular polarization states).

In addition to multiplexing pixels with different orthogonal polarization state, each polarization state can also be multiplexed with different wavelengths. This combined polarization-wavelength multiplexing can be used to select an appropriate optical surface with its inherent focal plane distance. For example, if two different RGB wavelength sets are used for each polarization four different focal plane distances are implemented. As shown in FIG. 8E, a filter 805 includes separate RGB filters with different spectra, $RGB_1$ and $RGB_2$. In this example, a cell 870 includes two red filters, two blue filters, and four green filters forming an 8-pixel wide by 1-pixel high cell. Each cell 870 is repeated across each row and is slightly offset between rows. In addition, Different orthogonal polarizations are associated with alternating rows of the filter 805. In this example, s-type and p-type linear polarizations are shown; however, any two orthogonal polarization states may be used (e.g., circular polarization states).

Additionally, and alternatively, the examples provided herein can also be implemented with sequential color illumination configurations, such as used with a rotating color wheel projector, or tri-chromatic illumination systems. For example, a rotating wheel can be modified to include two or more RGB color filter sets so as to allow sequential illumination with different RGB sets which is effective with the white light source. For tri-chromatic illumination, the light sources can be replaced such that each color is effected using two or more LEDs at a different wavelength. The combined effect of the LED illumination forms different RGB sets to provide multiple focal distances for images, yet, because the tri-chromatic channels are broadband, each modified color, for example, each of the different red wavelengths, $R_i$, can be transmitted through the red illumination channel.

Optical System

Each of the display systems 110 described above can be combined with a corresponding optical system 120 to form a multiple focal plane image, for example for use in combination with a 3D display for a wearable AR system. Two examples of optical systems 120 are shown in FIGS. 9A and 9B.

A combiner-imager of optical system 120 comprises two magnifying reflecting optic or a single visor with several reflecting surfaces. For example, a different reflecting surface is provided for each corresponding focal plane distance desired for images provided from the display system 110. Each of the reflecting surfaces is coated so as to reflect one set of RGB wavelength or polarized light and transmit the other RGB or polarized sets of illumination. Similarly, the combined surfaces of the combiner-imager are sufficiently transparent to allow the user 130 a direct view of the environment.

Figure 9A:
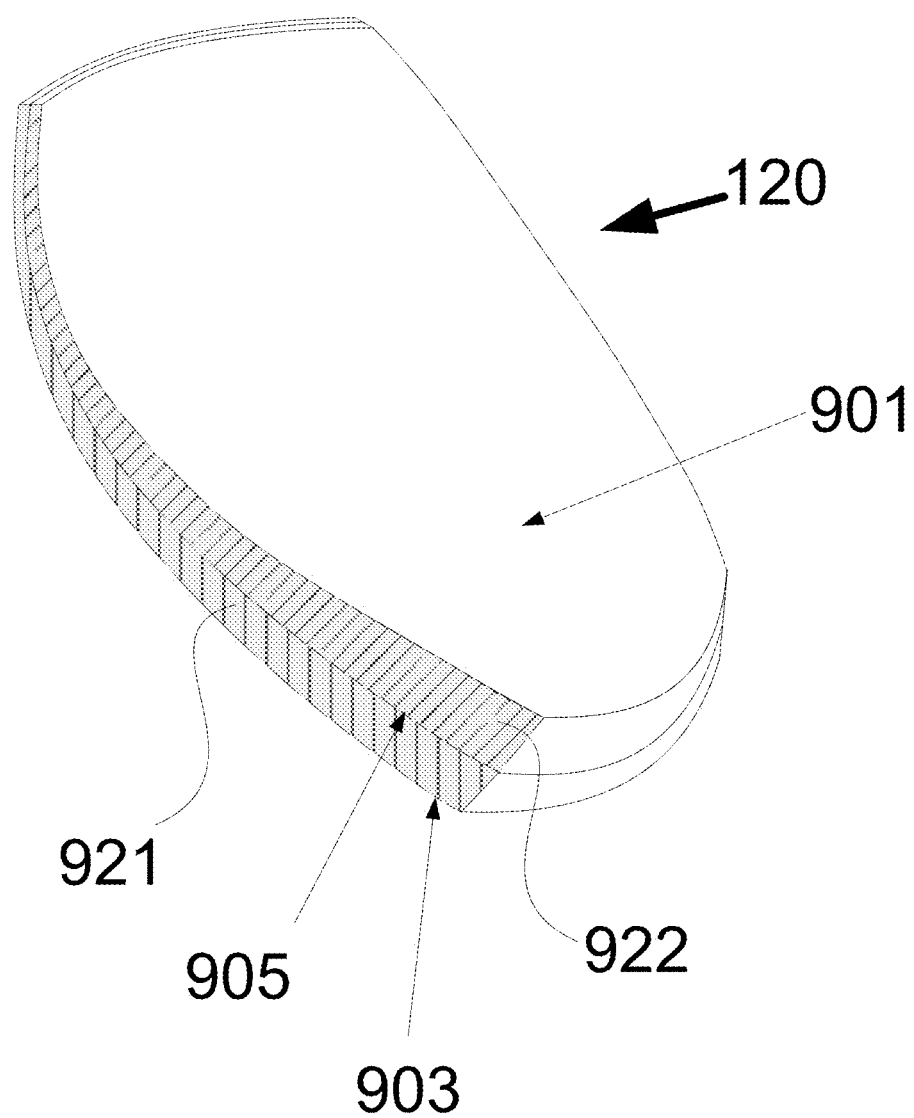
FIGS. 9A and 9B illustrate examples of a sectional view of a two-layer combiner-imager.
Figure 9B:
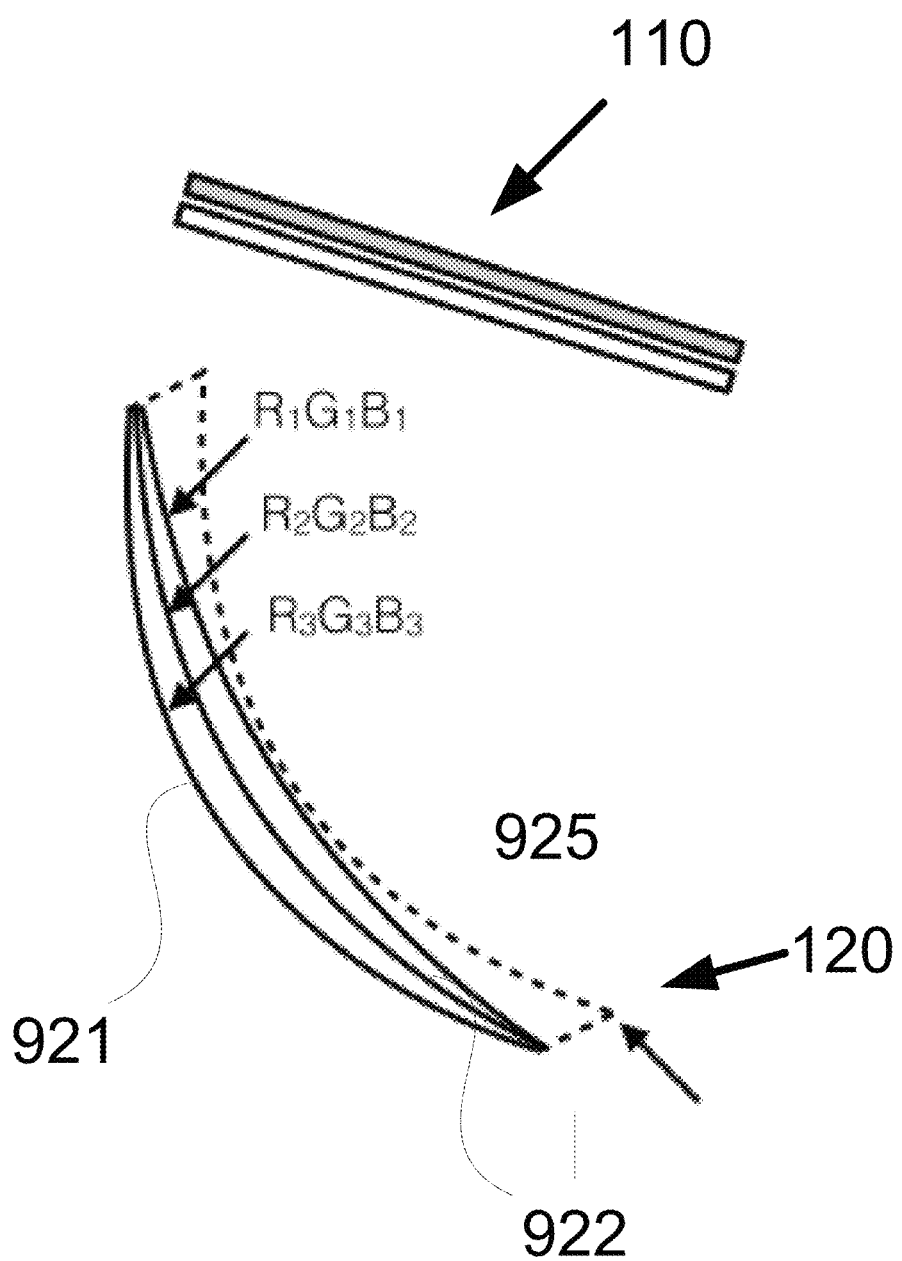

As shown in FIG. 9A, the combiner imager 120 includes three reflecting surfaces 901, 903, and 905 provided to redirect the synthetic image from the display system 110 (not shown in the figure) onto the eye 125 of a user 130 (not shown in the figure). In this example, the reflecting surfaces are formed by combining two shells 921 and 922 to form a magnifying reflecting optic. Each shell includes a first surface and a second surface. The second surface of shell 922 has a curvature closely matching the first surface of shell 921 so that the shells fit together to form a monolithic combiner-imager with three reflecting surfaces that each have a different curvature, for example, the first surface 901 (e.g., an interior surface), the intermediate surface 903 (e.g., a surface provided between the shells), and the third surface (e.g., an exterior surface). Each reflecting surface has a different curved geometry corresponding to the curvature of the first or second surface of the shells providing a different optical power so that reflection of light from each surface generates an image at a different focal distance. Each of the reflecting surfaces 901, 903, and 905 are coated with a tri-chromatic reflecting coating for wavelength multiplexing between three RGB sets (e.g., the sets $RGB_1$, $RGB_2$ and $RGB_3$ as shown in FIG. 2). The tri-chromatic coating can be implemented by superimposing three notch-reflecting filters to ensure that each reflecting surface is transparent to the other RGB sets.

In the case of two orthogonal polarization sets of illumination for polarization multiplexing only two surfaces with reflective coating are provided. In this example, a single shell with two surfaces is used (e.g., an interior surface and an exterior surface). Alternatively, any two of the three surfaces 901, 903, and 905 can be used. A polarization reflecting coat to reflect a single set of polarized RGB backlight is provided on each surface. The polarization reflecting coating is easier to implement than the wavelength selective coating and can readily filter between two orthogonal polarizations (e.g., both linear and circular polarizations), although it is emphasized that, typically the reflectivity of each surface is partial, allowing sufficient transmission of the environmental image to the user's eyes.

In yet another example, a combiner-imager for combined orthogonal polarization state multiplexing and wavelengths multiplexing includes surfaces with reflective coating for two polarization states and two wavelengths. In this example, four surfaces are provided.

Typically, many imaging displays, such as LCD, LCoS and others, output polarized light, so the multiple surface combiner-imager need reflect the RGB wavelength multiplexed illumination sets only in one polarization. This both simplifies the implementation of the reflecting coating (which are required to reflect only one polarization) and also allows the increase of the transmission of the combiner-imager which essentially can allow for full transmission of the polarization perpendicular to that output by the display.

FIG. 9B shows a similar combiner-imager to that of FIG. 9A, but with an additional element provided. The additional element may be another shell 925 having a first and a second surface. In one example, the second surface of shell 925 has a curvature closely matching the first surface of shell 922 so that the shells 921, 922, and 925 fit together to form a monolithic combiner-imager. In addition, the first surface of shell 925 has a curvature mirroring the curvature of the second surface of shell 921 to compensate for varying thickness of the shells 921 and 922 providing the reflective surfaces 901, 903, and 905 to prevent distortion of the transmitted external environmental view to the user. For example, distorted images could be found where there is a significant variation in the thickness of the combiner-imager. Naturally such complement surface may equally well be applied in front of the outer surface, 921.

The reflectivity of the coatings for any particular application are chosen with the following tradeoff: as the reflectivity of each reflecting surface is allowed to increase, the transmission of the view of the environment decreases correspondingly. For example, when very narrow RGB bandwidths are used to implement each RGB set, and where the display system 110 is polarized, the removal of narrow bands from the external view in one polarization are essentially difficult to notice. Therefore, reflective coatings having high values of reflectivity, for example, perhaps as high as 90% and above, may be used. In other examples, where the RGB bandwidth sets are broader and non-polarized light is output from the display system, a suitable reflectivity value for the surfaces would be, for example, 40 to 60%.

Other Aspects

FIG. 10 shows one example of a wearable AR system including a housing 1001 configured to be worn on the head 1010 of a user 130. The housing holds and positions the display system 110 and the optics system 120 relative to the eyes 125 of a user 130.

Figure 11A:
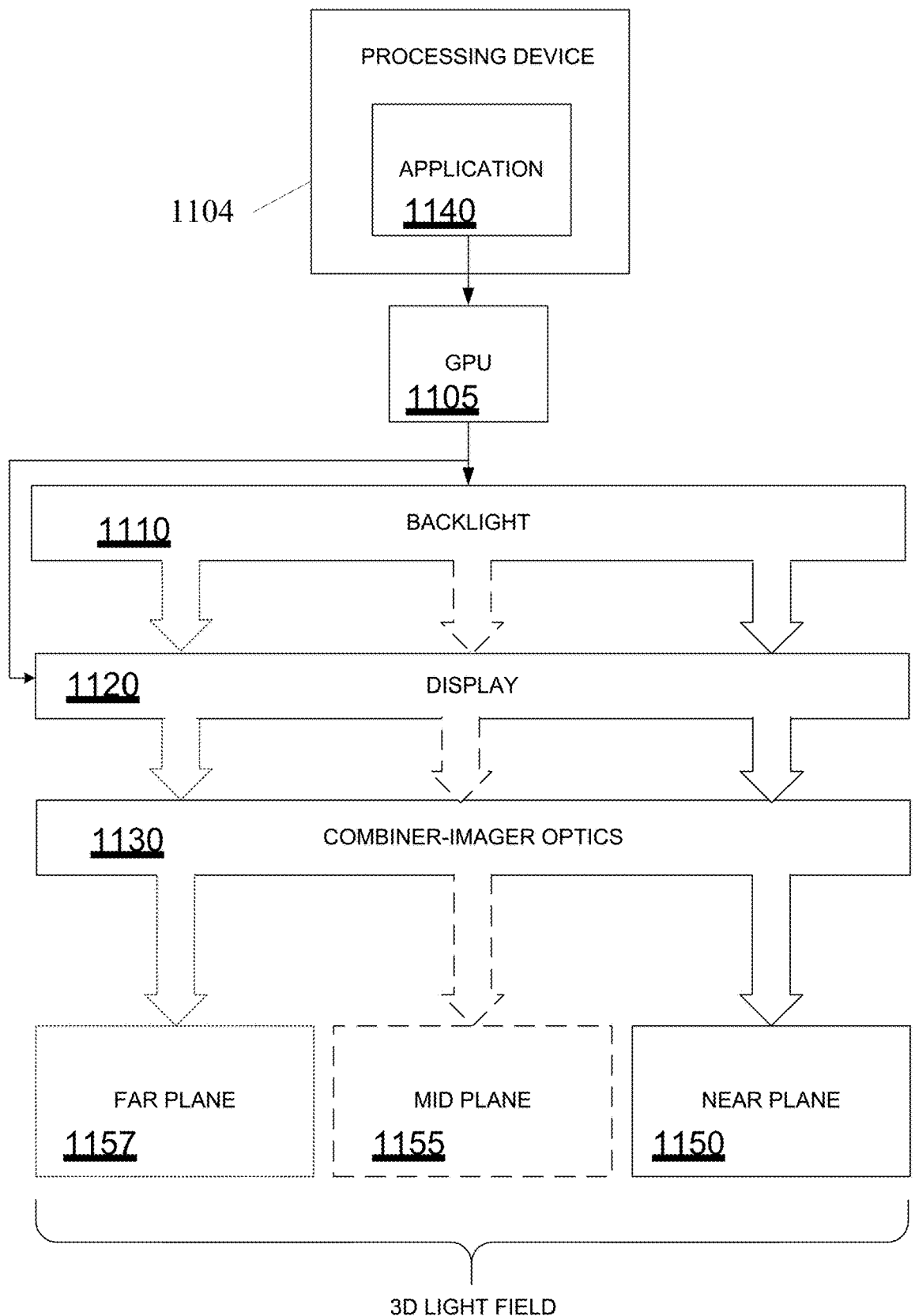
FIGS. 11A and 11B are block diagrams illustrating examples of a wearable AR system.
Figure 11B:
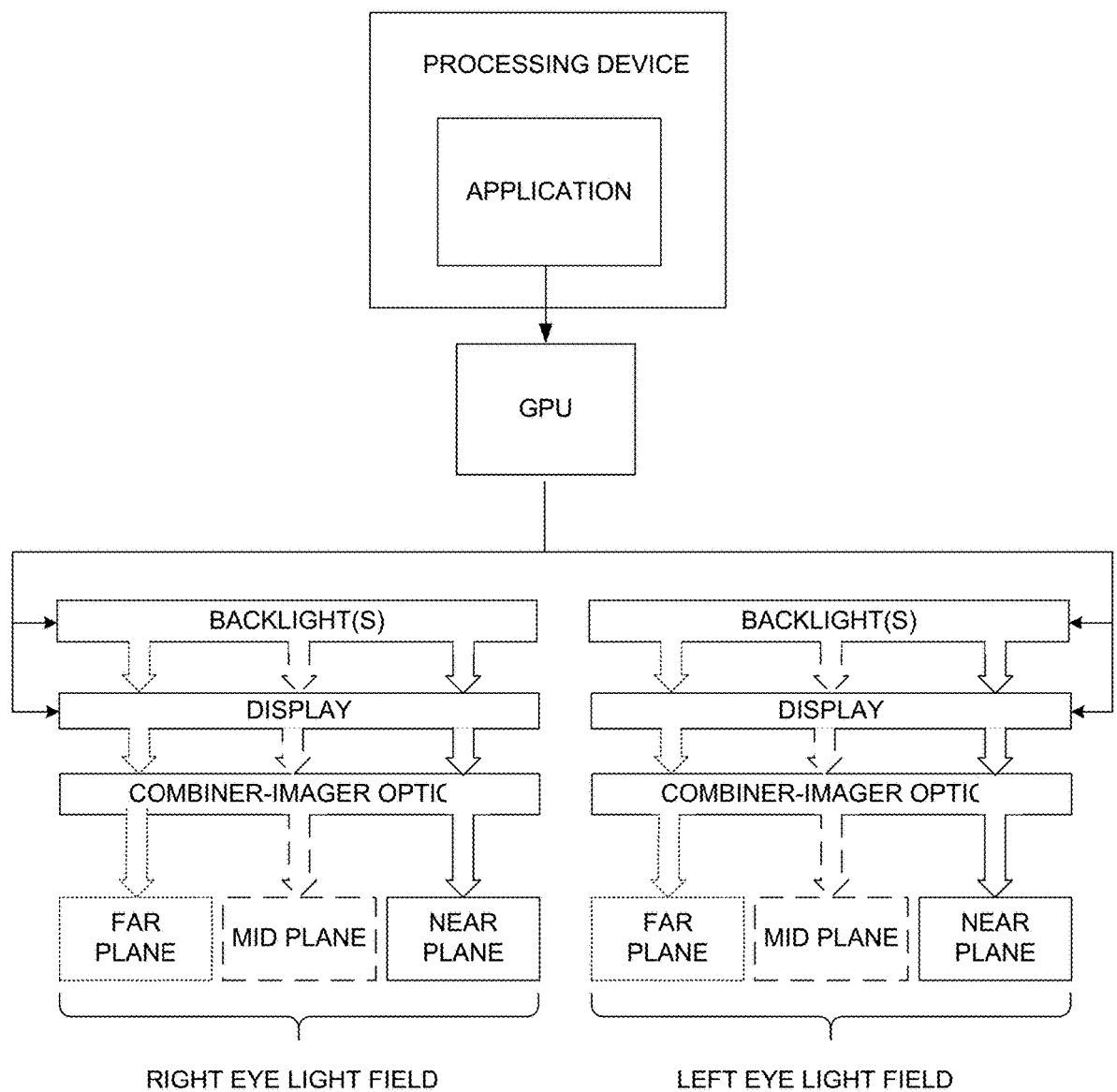

FIGS. 11A and 11B show block diagrams of two wearable AR systems. Each system includes a processing device 1104 and a graphics processing unit (GPU) 1105. The system of FIG. 11A may be implemented for a wearable visor and the system of FIG. 11B may be implemented for wearable glasses with separate image displays and optics.

For example, as shown in FIG. 11A the processing device 1104 and GPU 1105 control multiplexing of sets of light provided by a single backlight 1110 and display 1120 that is output to a single combiner-imager 1130. As shown in FIG. 11B, the processing device 1104 and GPU 1105 control multiplexing of sets of light provided by two backlights $1110_1$, $1110_2$ and two displays $1120_1$, $1120_2$ that are output to two combiner-imagers $1130_1$, $1130_2$. In the examples shown, the backlight 1110 and display 1120 together implement the display system 110 and the combiner imager 1130 implements a display system.

As show, each system includes a processing device 1104. The processing device 1104 may implement one or more applications or programs. In one example, the processing device 1104 includes an associated memory (not shown) storing one or more applications 1140 implemented by the processing device 1104 that generates digital image data depicting one or more of graphics, a scene, a graphical user interface, a computer game, a movie, content from the Internet, such as web content accessed from the World Wide Web, among others, that are to be presented to a viewer of the wearable AR system. Examples of applications includes media players, mobile applications, browsers, video games, and graphic user interfaces, to name but a few.

The wearable AR system also includes a GPU 1105. The GPU 1105 may be one or more of a standalone graphics processor, an integrated graphics processor, or a combination thereof configured to control two or more displays and corresponding backlights to present an image to the user of the wearable AR system. For example, the GPU 1105 receives an image from the application 1140 and processes the image for output to the display 1110. In addition, the GPU controls multiplexing of the backlight to provide two or more sets of RGB images each corresponding to the different focal plane distance. The GPU may control any one of wavelength multiplexing, polarization multiplexing, or hybrid wavelength/polarization multiplexing, as described above with regard to FIGS. 1-8. In the example shown in FIGS. 11A and 11B, the GPU 1105 controls multiplexing three sets of $RGB_1$, $RGB_2$ and $RGB_3$, whether related to wavelength, polarization or a combined multiplexing arrangement, to create an image at a near plane 1150, mid plane 1155, and far plane 1157. The GPU fires the RGB LEDs or controls the pixel for the different colors or polarization as defined by the filters in front of them sequentially and in synchronism with the activation of the relevant color pixels of the display. For example, three sets of RGB LEDs each centered at different wavelengths can be sequenced to backlight the colored pixels of the display 1120 to generate an image at three focal distances corresponding to the reflective coating and curvatures of the combiner-imager 1130.

In the case of dual-eye projecting wearable displays, as shown in FIG. 11B, the implementation is very similar to that described above for the single input display and single combiner-imager configuration shown in FIG. 11A. For example, as shown in FIG. 11B, there are two input displays, and two combiner-imagers: one for each eye. In this case, each input display is fitted with a modified backlight with two or more RGB sets as described above for the single input display configurations. Similarly, each combiner-imager should incorporate a corresponding set of wavelength and/or polarization segregated optical magnifying reflection surfaces each providing for a different optical power to form an image at a different focal distance. In one example, a dual-eye wearable AR system uses zero-optical power combiner-imagers (essentially a planer reflecting surface) so the wavelength/polarization segregated optical power is implemented in the magnifying optical portion of the display projection to each eye. In this case lenses are often used, and the wavelength/polarization segregation uses RGB set segregating filters as described above and different optical magnification lenses. These can be implemented in physically separate optical paths, or in a configuration similar to that proposed for the single combiner-imager using a reflective element with multiple, different curvature surfaces with wavelength/polarization segregating coatings. Similarly, in the case of stereoscopic projectors, multiple backlight RGB sets can be incorporated to the input display, and a wavelength/polarization segregating optical system included to image each RGB backlight set at a different focal distance. This applies both for single and dual input display arrangements. It also applies equally well to systems using active (switching) or passive (polarized, color coded) readout glasses as explained below.

As described above the wearable AR display system projects synthetic images from the display system 110 at different focal plane distances. This is done, for example, by selecting the RGB illumination sets, where each such set is imaged with a different magnifying reflecting surface incorporated within the combiner-imager. In this manner, the wearable AR display can be used to generate images at different focal plane distances. Each RGB set generates an image at a single focal plane distance. Switching between the RGB sets moves the image to a different focal plane distance. Additionally, and optionally, the wearable AR display can activate more than one image distance sequentially so that two or more images can be activated to be perceived simultaneously by interleaving the RGB illumination between the required focal plane distances (and the interleaving frequency can be made sufficiently high, say more than 30 Hz, to be unnoticed by a user). Naturally, in addition to the focal plane distance variation, the divergence of each image can be controlled through suitable lateral shift of the images on the input display screen. The combined adjustment of the vergence of the binocular vision and generating their correct focal plane distance closely mimics the visual perception of a true three-dimensional image and improves the 3-D perception of a user as well as reducing the eye fatigue of a user where the vergence and depth of focus visual cues do not match.

By way of example, consider a wearable AR display system where the display system 110 is located approximate 4 cm from the combiner-imager 120. To generate an image perceived by the user at approximately 80 cm depth, a reflecting surface with a radius of 84.2 mm is provided. In one example, the table below provides exemplary values for the curvature of the combining-imaging reflective surfaces provided for other focal depths.

|  | Focal depth [cm] | | | |
| --- | --- | --- | --- | --- |
|  | 80 | 160 | 400 | ∞ |
| Combiner- Imager radius [mm] | 84.2 | 82.1 | 80.8 | 80 |

As can be seen the required variation in the radius of curvature of the combiner-imager for covering a large range of focal depths is moderate, for example, varying between 80 to 84.2 mm, or 82.1 mm±2.6%. As a result, one configuration of the wearable AR system can be implemented in a reasonably sized multiple-surface combiner-imager for an average user. Furthermore, the accommodation depth of the eye of a user is not sensitive. For example, it is widely accepted that a 0.5 diopter variation in focus is well tolerated by the human eye. Consequently, only as small number of focal distance settings are required to cover the operational range of a wearable AR display, as described further below.

Taking a more general perspective, the optical power required from a near-eye display is dependent on both the distance between the optics and the input display, u, and the required focal depth, v. These distances define the optical power P required according to the lens equation:

$$P=1/u+1/v$$

Figure 12A:
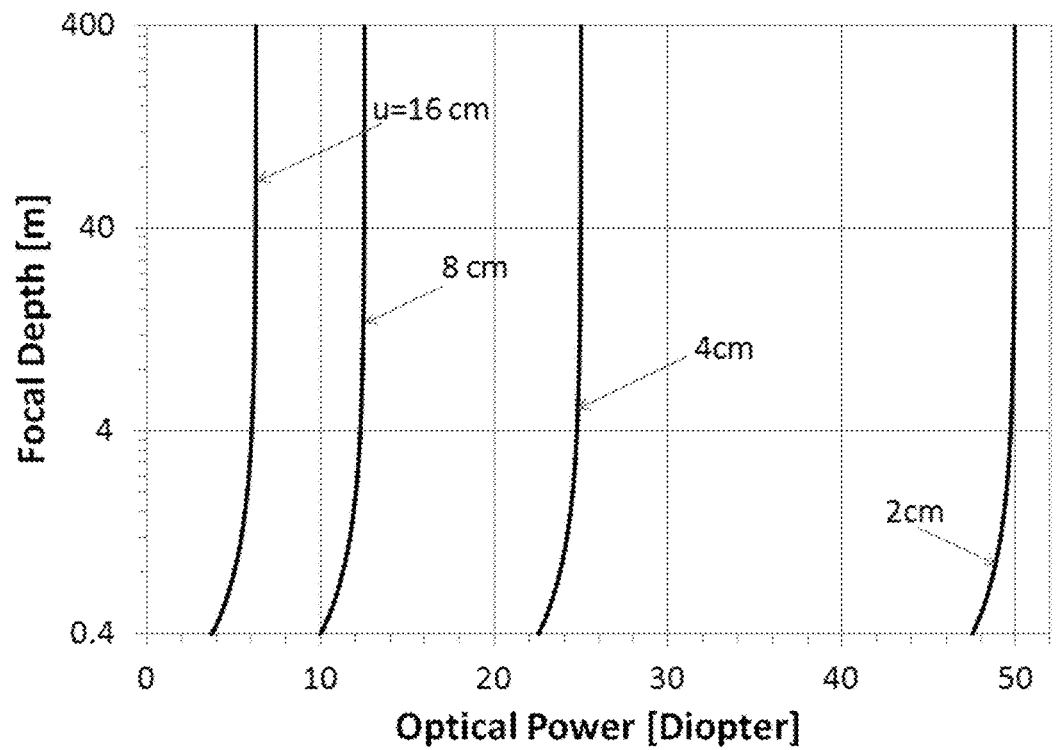
FIG. 12A shows an example of the relation between the focal plane distance and the optical power of the imaging optics for different values of display-to-optics separation, u.
Figure 12B:
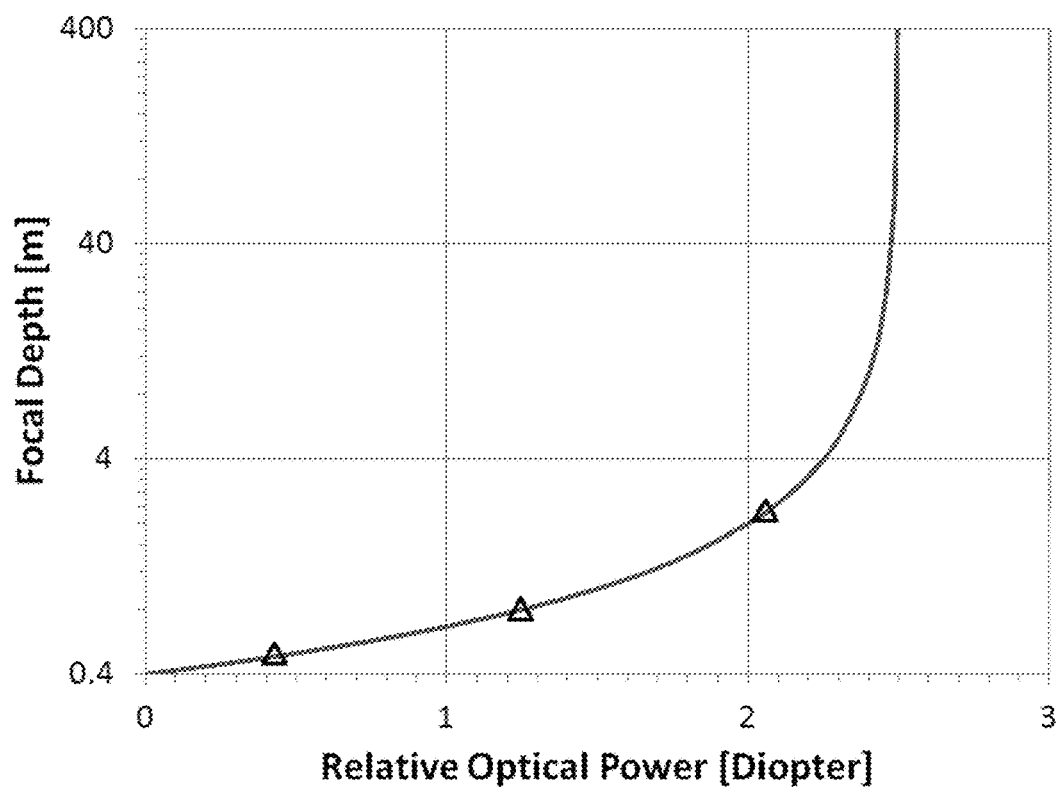
FIG. 12B shows graphs of examples of the relation between the focal plane distance and the relative change in optical power of the imaging optics.

FIG. 12A shows examples of graphs relating the optical power in a near-to-eye display to the focal plane distance of the image for different optics-input display distances, u. These graphs show a strong dependence between the display distance and the required optical power, such that P~1/u: for u=2 cm, for example, P~50 diopter, etc. This effect is also shown by the lens equation above: since the focal depth distances, v, are all larger than 40 cm (the closest accommodation distance of the eye), the much smaller values for u dominate. As shown in FIG. 12B, the variation in optical power for a given optical system over the focal plane distance range of 40 cm to ∞ is plotted for the four values of u considered in FIG. 14A. As shown, the relative variation in optical power for the above range of focal plane distance values is identical for all values of u. In other words, any near-to-eye display uses the same variation in optical power to locate the focal plane distance anywhere from v=40 cm to ∞. The graph of FIG. 12B also shows that the entire variation in optical power required is limited to 2.5 diopter. As pointed out above, an error of 0.5 diopter is tolerated by the eye. Therefore, to cover the entire 2.5 diopter range with a tolerance of 0.5 diopter, only three focal plane distance values are needed, for example, settings at 0.42, 1.25 and 2.08 diopters. These settings are indicated with triangular markers on the graph of FIG. 12B, illustrating that any focal depth value can be addressed with a maximal focusing error that is smaller than 0.5 diopter.

Although several examples have been provided above, one skilled in the art will appreciate the teachings and example provided are equally applicable, with the appropriate modifications, to other display system configurations. For example, in the case of stereoscopic projectors, multiple backlight RGB sets can be incorporated to the input display, and a wavelength/polarization segregating optical system may be included to image each RGB backlight set at a different focal distance. This applies both for single and dual input display arrangements. It also applies equally well to systems using active (switching) or passive (polarized, color coded) readout glasses as explained above.

For example, switching read-out glasses which alternatingly block an image from one eye and expose it to the other, are not affected by the multiplexing backlights. At any given instance only one image is displayed to one eye and there are no wavelength nor polarization limitations imposed on the image. Passive viewing glasses with different color codes to each eye are anaglyph 3D viewing systems where different color spectra are directed to each eye. The different spectra allow for segregation of the image seen by each eye. The visual cortex in the brain fuses the two images into a 3D, full color image. Consequently, providing different RGB color codes or polarizations in such systems does not affect the image formed by color coded 3D glasses which have relatively large viewing spectra to each eye. As for passive viewing glasses with different polarizations used to segregate the image to each of the eyes, these are not affected by the preceding wavelength multiplexing implementations. To use such glasses with polarization multiplexing implementations described herein an additional polarization coding is added after the selection of the different focal distance channels. The polarization coding for the left/right eye is selected to be at non-orthogonal polarization to the focal plane distance polarization multiplexing. For example, if the polarization focal distance multiplexing is performed with a horizontal and vertical polarizations, the 3D passive viewing filters are made to provide linear polarization at 45 degree to the horizontal, or with circular polarization.

As described above, the techniques described herein for a wearable AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid-state memory devices; magnetic disks, such as, internal hard disks or removable disks; magneto-optical disks; and CD-ROM and DVD-ROM disks. The processor and the memory can be supplemented by or incorporated in special purpose logic circuitry.

The wearable AR system may include various other components including various optical devices and frames or other structure for positioning or mounting the display system on a user allowing a user to wear the vision system while providing a comfortable viewing experience for a user. The wearable AR system may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided to connect the various components and allow reception, transmission, manipulation and storage of data and programs.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A method of backlighting displays of a head mounted virtual or augmented reality display system providing a three dimensional (3D) volumetric field of view (FOV) for a user of the display system; the display system including a display, a backlight configured to illuminate a back of the display, and an optical system positioned relative to the display configured to reflect light projected from a front of the display to an eye of a user wearing the display system, the method comprising:
providing an image for presentation by the display system;
determining a focal distance corresponding to the image from a plurality of focal distances in the 3D volumetric FOV;
presenting the image on the display;
illuminating the back of the display presenting the image with light having a first physical property corresponding to the determined focal distance selected from a plurality of physical properties of light generated by the backlight;
wherein the light having the first physical property corresponds to one of a plurality of optical surfaces of the optical system, the one optical surface having a reflective coating that only reflects light having the first physical property, and wherein the light reflected by the one optical surface is perceived by the eye of the user as being located at the determined focal distance within the 3D volumetric FOV.

2. The method of claim 1, wherein illuminating the display with light selected from different ones among the plurality of physical properties in synchronization with a corresponding image presented by the display varies the perceived focal distance of the corresponding image within the 3D volumetric FOV.

3. The method of claim 1 further comprising: controlling sequencing of images presented by the display and illumination provided by the backlight in combination with vergence of the images to either eye of the user to create an image that is perceived as three-dimensional by the user.

4. The method of claim 1, wherein the backlight is configured to generate light of the same color that is centered at two or more different wavelengths, and wherein illuminating the back of the display presenting the image with light having the first physical property further includes generating light having a first of the two or more different wavelengths.

5. The method of claim 4, wherein the backlight includes a plurality of light emitting diodes (LEDs) divided into at least two sets, each set having at least one red (R) LED, one green (G) LED, and one blue (B) LED, where a first of the two sets of RGB LEDs is configured to produce the light having the first wavelength.

6. The method of claim 1, wherein the backlight includes a plurality of light emitting diodes (LEDs) divided into at least two sets, each set having at least one red (R) LED, one green (G) LED, and one blue (B) LED, where a first of the two sets of RGB LEDs is configured to produce the light having the first physical property.

7. The method of claim 1, wherein the backlight is configured to generate light of the same color at one of two orthogonal polarizations, and wherein illuminating the back of the display presenting the image with light having a first physical property further includes generating light having a first of the two orthogonal polarizations.

8. The method of claim 1, wherein the backlight includes a white light illumination source and wherein illuminating the back of the display presenting the image with light having a first physical property further includes selectively filtering the white light to illuminate the display with colored illumination having the first physical property.

9. The method of claim 1, wherein the backlight includes a white light illumination source and wherein illuminating the back of the display presenting the image further includes selectively filtering the white light to illuminate the display with colored illumination of the same color at one of two orthogonal polarizations, wherein first physical property corresponds to a first of the two polarizations.

10. The method of claim 1 further comprising:
determining second focal distance corresponding to second image from a plurality of focal distances in the 3D volumetric FOV;
presenting the second image on the display;
illuminating the back of the display presenting the second image with light having a second physical property corresponding to the determined focal distance selected from the plurality of physical properties of light generated by the backlight;
wherein the light having the second physical property corresponds to a second of a plurality of optical surfaces of the optical system, the second optical surface having a reflective coating that only reflects light having the second physical property, and wherein the light reflected by the second optical surface is perceived by the eye of the user as being located at the determined second focal distance within the 3D volumetric FOV.

11. The method of claim 10 further comprising: multiplexing the backlight illumination of light having the first physical property and light having the second physical property with respect to a series of two dimensional images presented by the display to create an image perceived by the user of the system as a single three-dimension image within the 3D volumetric FOV.

12. The method of claim 11, wherein the multiplexing is one of: wavelength multiplexing, polarization multiplexing, and a combination of polarization and wavelength multiplexing.

13. The method of claim 10 further comprising: controlling presentation of images by the display and selecting an optical focal distance for the image presented by the display by controlling illumination by the backlight to provide the light having the first physical property and the light having the second physical property corresponding to the selected optical focal distance.

14. The method of claim 10, further comprising: multiplexing the selecting of the light having the first and second physical properties with respect to the image presented by the display to create an image perceived by the user of the system as a single three-dimension image within the 3D volumetric FOV.

15. The method of claim 14, wherein the multiplexing is one of: wavelength multiplexing, polarization multiplexing, and a combination of polarization and wavelength multiplexing.

* * * * *